(12) United States Patent
Wyeth

(10) Patent No.: US 12,533,449 B2
(45) Date of Patent: Jan. 27, 2026

(54) METHODS, DEVICES, AND SYSTEMS FOR PROVIDING PERITONEAL DIALYSIS FLUID FROM POWDERED CONCENTRATE

(71) Applicant: NxStage Medical, Inc., Lawrence, MA (US)

(72) Inventor: Mark T. Wyeth, Andover, MA (US)

(73) Assignee: NxStage Medical, Inc., Lawrence, MA (US)

( * ) Notice: Subject to any disclaimer, the term of this patent is extended or adjusted under 35 U.S.C. 154(b) by 845 days.

(21) Appl. No.: 17/778,286

(22) PCT Filed: Nov. 17, 2020

(86) PCT No.: PCT/US2020/060903
§ 371 (c)(1),
(2) Date: May 19, 2022

(87) PCT Pub. No.: WO2021/101899
PCT Pub. Date: May 27, 2021

(65) Prior Publication Data
US 2022/0401633 A1    Dec. 22, 2022

Related U.S. Application Data

(60) Provisional application No. 62/937,922, filed on Nov. 20, 2019.

(51) Int. Cl.
*A61M 1/16* (2006.01)
*A61M 1/28* (2006.01)

(52) U.S. Cl.
CPC ........ *A61M 1/1656* (2013.01); *A61M 1/1601* (2014.02); *A61M 1/1666* (2014.02); *A61M 1/1672* (2014.02); *A61M 1/287* (2013.01)

(58) Field of Classification Search
CPC .............. A61M 1/1601; A61M 1/1656; A61M 1/1666; A61M 1/1672; A61M 1/287
See application file for complete search history.

(56) References Cited

U.S. PATENT DOCUMENTS

| | | |
|---|---|---|
| 2016/0008529 A1 | 1/2016 | Hoffman |
| 2017/0296730 A1 | 10/2017 | Soto et al. |

(Continued)

FOREIGN PATENT DOCUMENTS

| | | |
|---|---|---|
| WO | 2000057935 A1 | 10/2000 |
| WO | 2018017623 A1 | 1/2018 |
| WO | 2018237375 A1 | 12/2018 |

OTHER PUBLICATIONS

International Search Report and Written Opinion mailed Mar. 24, 2021 for International Patent Application No. PCT/US2020/060903.

(Continued)

*Primary Examiner* — John Kim
(74) *Attorney, Agent, or Firm* — Potomac Law Group, PLLC

(57) ABSTRACT

A proportioning system includes a solute container filled with dry solutes, a source of water, a container of electrolyte concentrate, a fluid circuit connecting the solute container to the source of water and the container of electrolyte concentrate, the fluid circuit having an empty mixing container, a controller configured to transfer water from the source of water to the solute container through the fluid circuit so as to prepare a solute concentrate solution in the solute container. The controller is configured to transfer fluid from the container of electrolyte concentrate to a mixing container as well as a solute concentrate from the solute container to the mixing container and further adding water to said mixing container to form a medicament therein.

9 Claims, 19 Drawing Sheets

(56) References Cited

U.S. PATENT DOCUMENTS

2019/0077845 A1 3/2019 Quinones-Garcia et al.
2019/0262524 A1 8/2019 Wyeth et al.
2019/0316948 A1 10/2019 Karol et al.

OTHER PUBLICATIONS

Invitation to Pay Additional Fees dated Jan. 25, 2021 for International Patent Application No. PCT/US2020/060903.
Extended European Search Report dated Oct. 25, 2023 for European Patent Application No. 20889739.7.

METHODS, DEVICES, AND SYSTEMS FOR PROVIDING PERITONEAL DIALYSIS FLUID FROM POWDERED CONCENTRATE

CROSS-REFERENCE TO RELATED APPLICATIONS

This application is a U.S. national stage filing under 35 U.S.C. § 371 of International Application No. PCT/US2020/060903, filed Nov. 17, 2020, which claims priority to and the benefit of U.S. Provisional Patent Application No. 62/937,922 filed Nov. 20, 2019, all of which are hereby incorporated by reference in their entireties.

BACKGROUND

Peritoneal dialysis fluid must be supplied at a point of use in order to perform peritoneal dialysis. Two basic method are employed, one is to supply prepackaged dialysis fluid from containers such as bags at the point of use. Another is to generate dialysis fluid from components such as liquid concentrate and water. One method of forming a liquid concentrate is to employ a dry powdered solute cartridge. See for example US Patent Publication No. 20170296730 in which a cartridge with solid solute delivers saturated concentrate when water is passed through it.

SUMMARY

A combined water and concentrate fluid module supplies concentrate and water through a single sterile filtered outlet on demand from a water source and from concentrate containers, according to embodiments of the disclosed subject matter. In said embodiments, one of the concentrates is provided from a container that contains powdered dextrose, a common constituent of peritoneal dialysis fluid. In alternative embodiments, the fluid module only provides one of two concentrates and the other concentrate, the dextrose, is provided by providing powdered dextrose in a secondary container or a batch container from which completed peritoneal dialysis fluid is drawn during a treatment.

Objects and advantages of embodiments of the disclosed subject matter will become apparent from the following description when considered in conjunction with the accompanying drawings.

BRIEF DESCRIPTION OF THE DRAWINGS

Embodiments will hereinafter be described in detail below with reference to the accompanying drawings, wherein like reference numerals represent like elements. The accompanying drawings have not necessarily been drawn to scale. Where applicable, some features may not be illustrated to assist in the description of underlying features.

DETAILED DESCRIPTION

Figure 1:
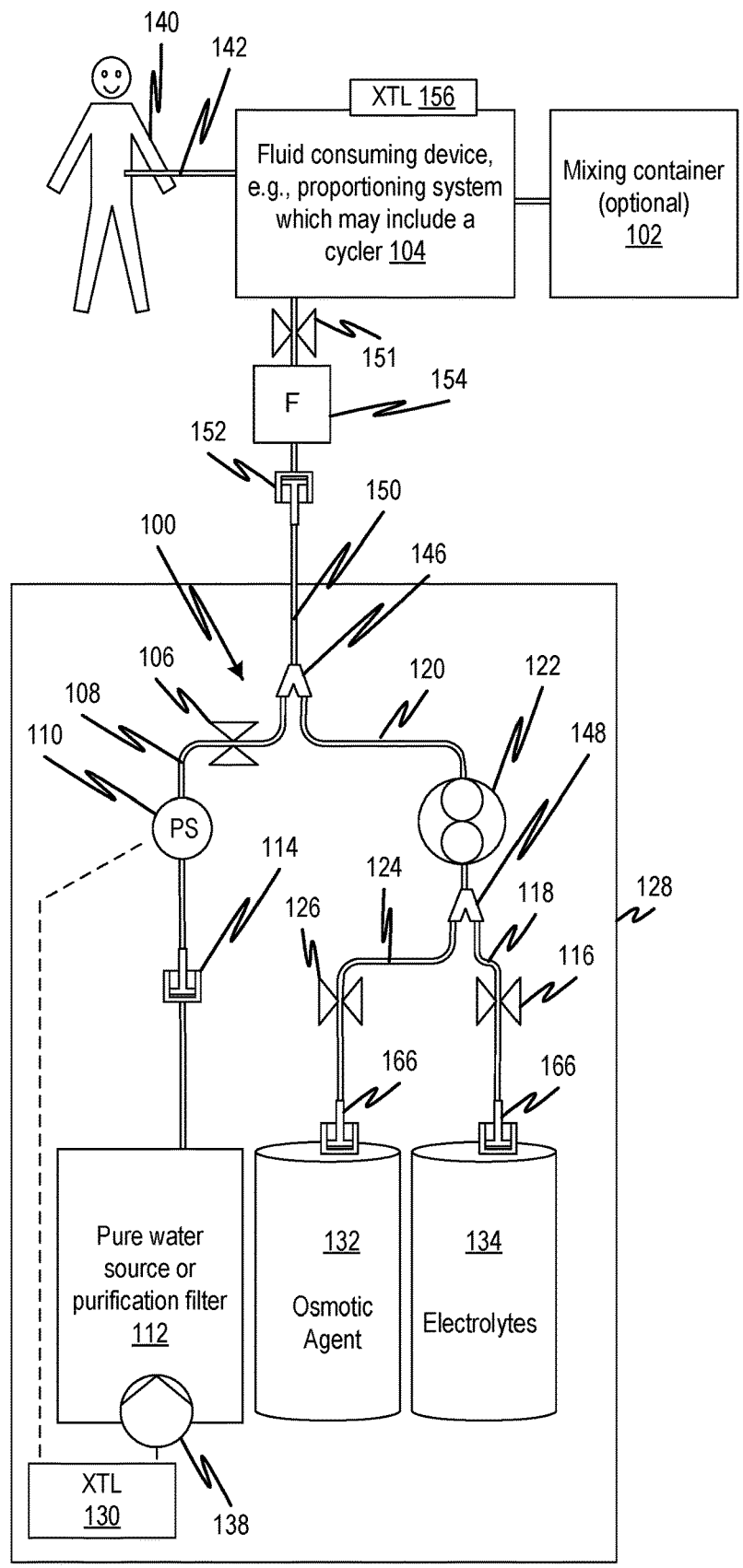
FIG. 1 shows a fluid module according to embodiments of the disclosed subject matter.

FIG. 1 shows a fluid source module 128 with a fluid circuit 100 according to embodiments of the disclosed subject matter. The fluid source module 128 provides fluid to a fluid consuming device 104. The fluid consuming device 104 may be a proportioning device, a peritoneal cycler, a storage container for fluids, or any other device that may receive fluids shown (water and/or one or more concentrates). An optional mixing container 102 may be connected to the fluid consuming device 104. The mixing container 102 may be used by embodiments of the fluid consuming device 104 to store fluids such as water, and/or concentrates to permit them to be mixed. In embodiments, the mixing container 102 becomes a source of peritoneal dialysate for treatment of a patient 140. Fill and drain line 142 may connect to the patient's peritoneal cavity to supply medicament into and to convey spent medicament out of the peritoneal cavity. The mixing container 102 may receive separate fluids at respective different times through a fluid line 150 which may be directly connected to connected by means of an aseptic connector 152.

The fluid source module 128 provides a selected fluid under control of a controller 130. The controller 130 receives pressure signals from a water pressure sensor 110, which may be fluidly connected by a connector 114 to a water source 112. A precision water pump 138 (if present depending on the embodiment) may be closed-loop controlled by controller 130 responsively to signals from water pressure sensor 110. A water source 112 may be any type of water source, preferably a source of purified water such as a water filtration system, an inline purified water source, or a container of purified water. In the embodiment shown, the precision water pump 138 is in a push configuration which is compatible with a water source 112 embodiment that includes, for example, a filter. A pull configuration of a water pump may be compatible with a container of purified water according to different embodiments. A filter embodiment may include ultrafilters, carbon filters, deionization filters, and/or reverse osmosis filters or other types of filters with multiple components.

Two other fluids that may be delivered to the fluid consuming device 104 through the fluid line 150, which may include for example, an electrolyte concentrate from an electrolyte concentrate container 134 and an osmotic agent concentrate from an osmotic agent concentrate container 132. Although these specific concentrates are shown, other types of concentrate may also be used with the disclosed embodiments including only a single concentrate. In operation, fluid source module 128 selects and delivers a selected fluid, one of water or one or the other of the concentrates into the fluid line 150 which then passes through a sterilizing grade filter 154 which ensures the sterility of the fluid consuming device 104 and any fluids passing into it.

Note that sterilizing grade filter 154 may be a pair of sterile filters separated by a channel to prevent grow through contamination as well as redundancy so that if one of the pair of sterile filters fails the other serves as a back-up, reducing the risk of contamination. Another type of filter that may be included in sterilizing grade filter 154 or constitute it is a testable filter such as one that has a pressurized air line through which air is pumped to do pressure test to test the integrity of the filtering process provided by it once fluid has passed through it. As shown in FIG. 1, a clamp 151 may be provided on the fluid line connecting the filter 154 with the fluid consuming device 104. The clamp 151 may be manually actuated or automatically actuated (opened and closed) in response to control signals from controller 156.

The selection of a single fluid provided through the fluid line 150 is determined by settings of the water line clamp 106, electrolyte concentrate line clamp 116, and osmotic agent concentrate line clamp 124. These clamps may be controlled by the controller 130. All fluids flow through fluid line 150 by way of flow junction 146 and both concentrates flow through flow junction 148. A peristaltic concentrate pump 122 pumps one or the other of electrolyte concentrate from electrolyte concentrate container 134 or osmotic agent concentrate from osmotic agent concentrate container 132 which are connected through flow junction 148. Water is pumped by the precision water pump 138 (or an alternative in the alternative embodiments discussed above). It will be evident that when the controller 130 commands or is commanded to flow water, the water line clamp 106 is opened and the electrolyte concentrate line clamp 116 and osmotic agent concentrate line clamp 126 are closed. When the controller 130 commands or is commanded to flow electrolyte concentrate, the electrolyte concentrate line clamp 116 is opened and the water line clamp 106 and osmotic agent concentrate line clamp 126 are closed. When the controller 130 commands or is commanded to flow osmotic agent, the osmotic agent concentrate line clamp 126 is opened and the electrolyte concentrate container 134 and water line clamp 106 are closed. In the case of one of the concentrates being provided, the peristaltic concentrate pump 122 is activated to force the selected fluid into the fluid line 150 and into the fluid consuming device 104 with the appropriate clamp setting. In the case of water being delivered, the water line clamp 106 is opened and the electrolyte concentrate line clamp 116 and osmotic agent concentrate line clamp 126 are closed. The corresponding pump water source 112 or precision water pump 138 is activated.

To provide a fluid under command of the fluid consuming device 104, a controller 156 of the fluid consuming device 104 may transmit a command to the controller 130 of the fluid source module 128 to command the correct setting of the aforementioned actuators. The controller 156 of the fluid consuming device 104 may also store and cumulate quantities of respective fluid predetermined to be left behind in the water line 108, concentrate line 120, electrolyte concentrate line 118, osmotic agent concentrate line clamp 124, and fluid line 150 as well as flow junction 146 and osmotic agent concentrate line clamp 126 in order to a full accounting of all fluids. Residual volumes of these components may be generated and accounted for by calculating and estimating based on known volumes of these components, their interconnections, and the sequence of operation. Further components that may contributing to a complete accounting may include the water pressure sensor 110 and the peristaltic concentrate pump 122.

The concentrate containers osmotic agent concentrate container 132 and electrolyte concentrate container 134 may or may not be connectable or permanently connected according to whether there is a connector 166 provided according to various embodiments. In embodiments where permanently connected the container may be pre-attached to a part of the fluid circuit that includes one or the other or both of the electrolyte concentrate line 118 and osmotic agent concentrate line clamp 124, for example.

The fluid circuit 100 may take a variety of forms that include permanent and replaceable components interconnected by various connectors. By providing the sterilizing grade filter 154, any risk of touch contamination due to change-out of components is largely eliminated.

Figure 2:
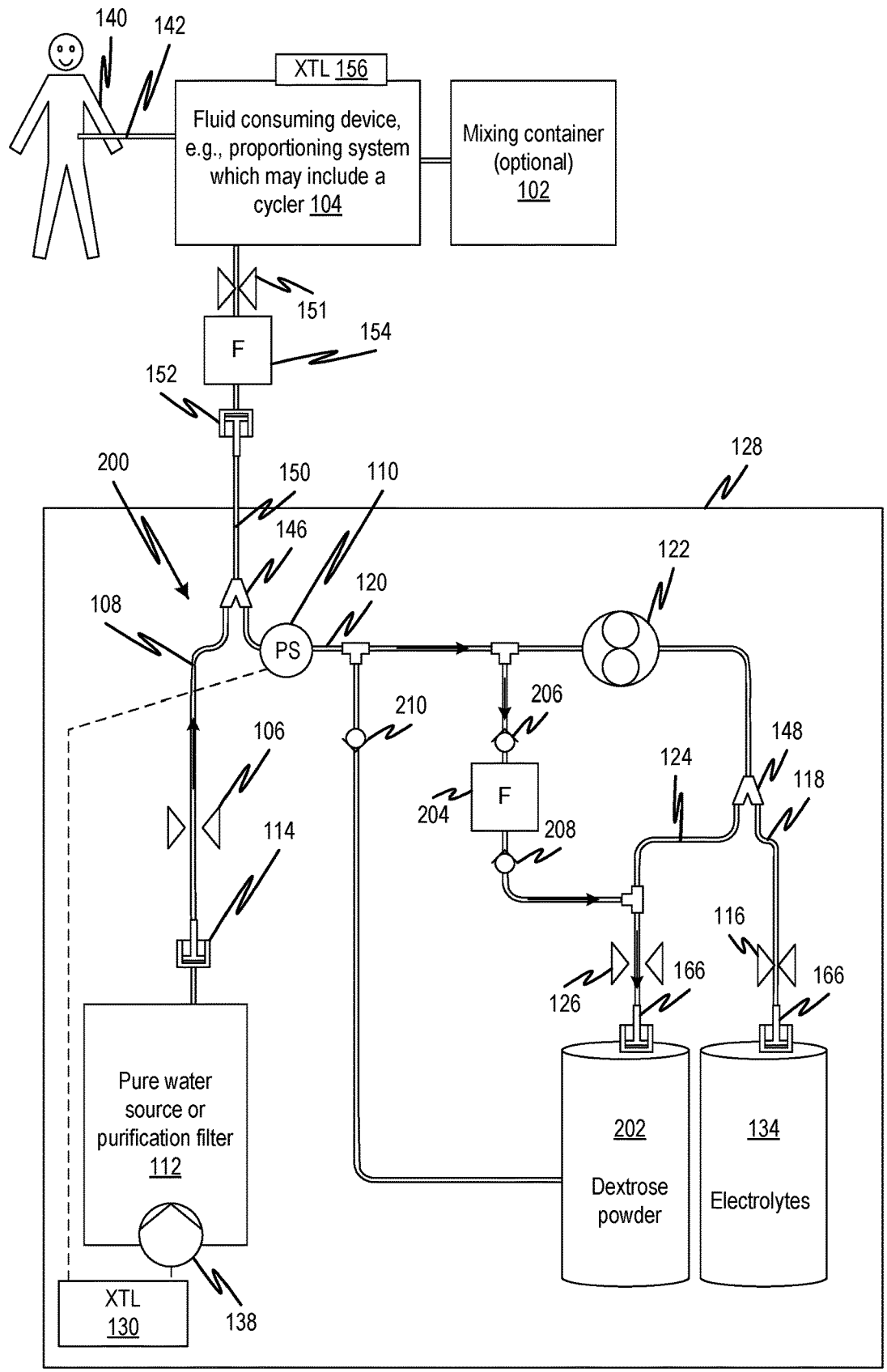
FIG. 2 shows an alternative fluid module in which one concentrate component is provided from a mixture of powdered solute that is mixed by the fluid module.
Figure 3:
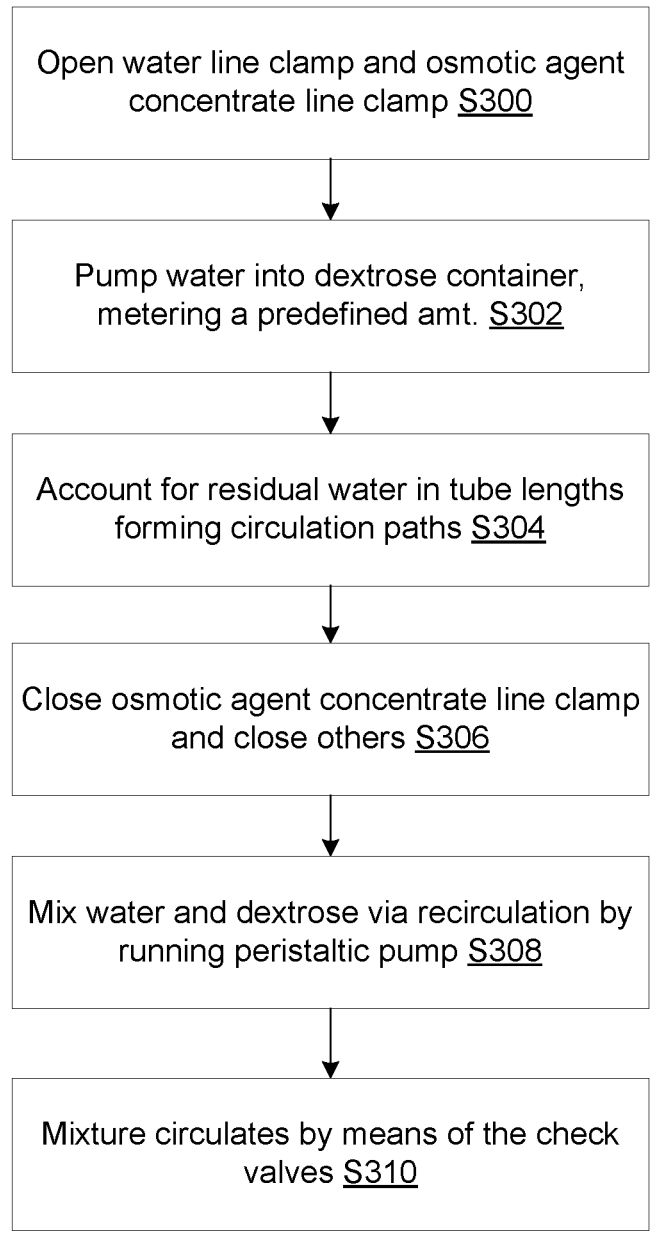
FIG. 3 shows a flow chart for a procedure for making a liquid concentrate from powdered concentrate according to embodiments of the disclosed subject matter.
Figure 4:
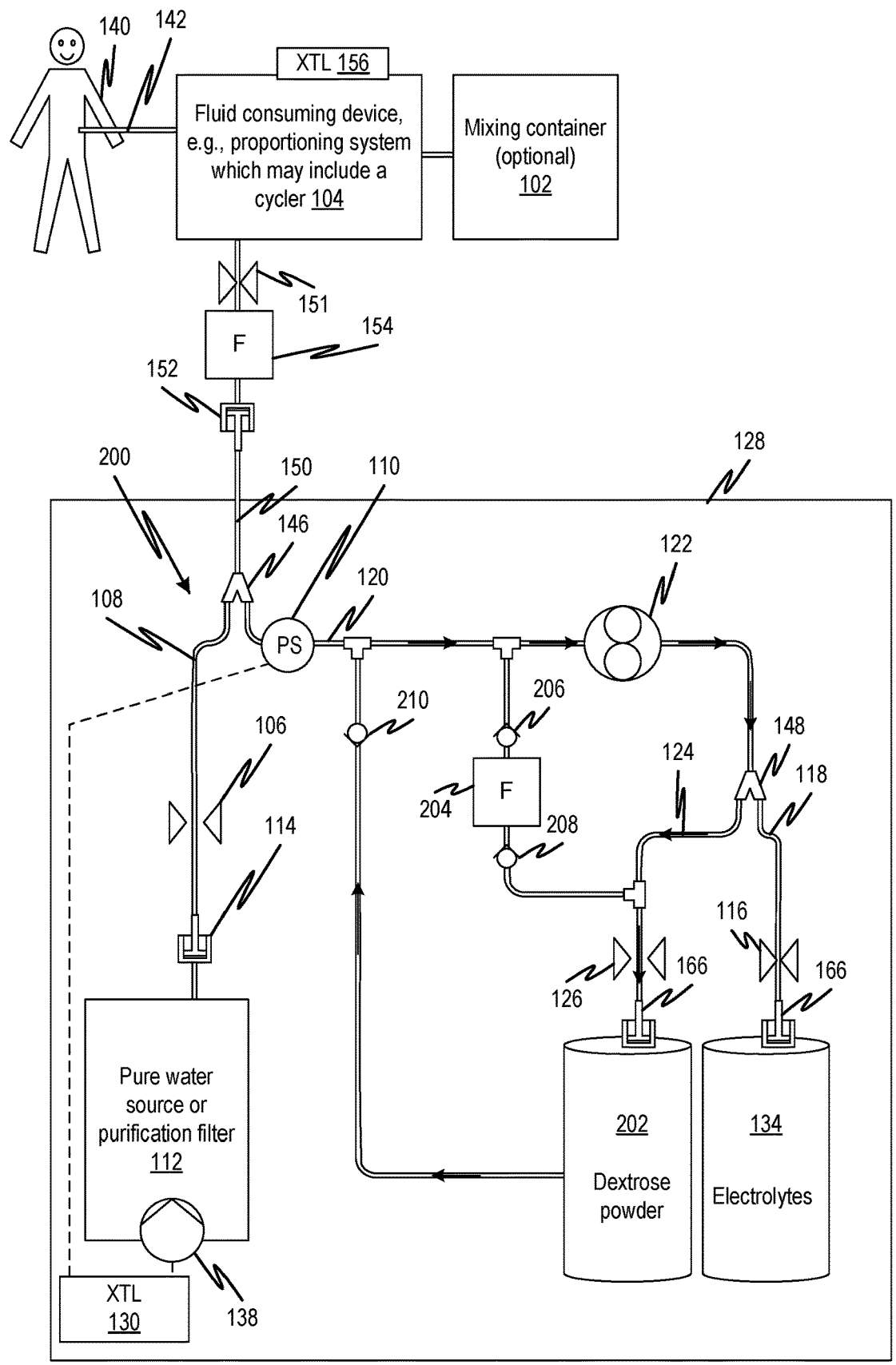
FIG. 4 shows the fluid module for the embodiment of FIG. 3, according to embodiments of the disclosed subject matter.

FIG. 2 shows an alternative fluid module in which one concentrate component is provided from a mixture of powdered solute that is mixed by the fluid module that includes a fluid circuit 200. In the example shown in FIG. 2, the osmotic agent is dextrose monohydrate, but it could be other types of solutes or osmotic agent in powdered form. In FIG. 2 there are many components that are the same as in the embodiment of FIG. 1. But additional elements are added to form a system in which a uniform mixed diluted liquid dextrose, which plays the role of the osmotic agent in osmotic agent concentrate container 132. The dextrose container 202 also functions as a mixing container as described below. Initially, in embodiment of FIG. 2, the water line clamp 106 is opened and the osmotic agent concentrate line clamp 126 is opened. See S300 in FIG. 3. Water is pumped by the precision water pump 138 forcing water as indicated by the arrows into the dextrose container 202 which is directed by the check valves. See S302 in FIG. 3. The controller 130 accounts for residual water in the tube lengths forming a circulation path so that the dextrose is correctly diluted. The circulation path is illustrated in FIG. 4. See S304 in FIG. 3. To form a recirculation path for mixing the water and dextrose powder, at S306, the osmotic agent concentrate line clamp 126 is opened and the other clamps are closed. At S308, the pump 122, for example a peristaltic pump is driven in the direction shown causing water and dextrose solute to flow as indicated by the arrows. See S308 in FIG. 3. Note that as indicated in FIG. 3 at S310, the test check valve 208 and fluid outflow check valve 206 prevent flow through the pump 122 so that dissolving dextrose is circulated as shown. Note that check valve 210 permits flow. Also, the closure of electrolyte concentrate line clamp 116 ensures there is no flow into the electrolyte concentrate container 134.

Figure 5:
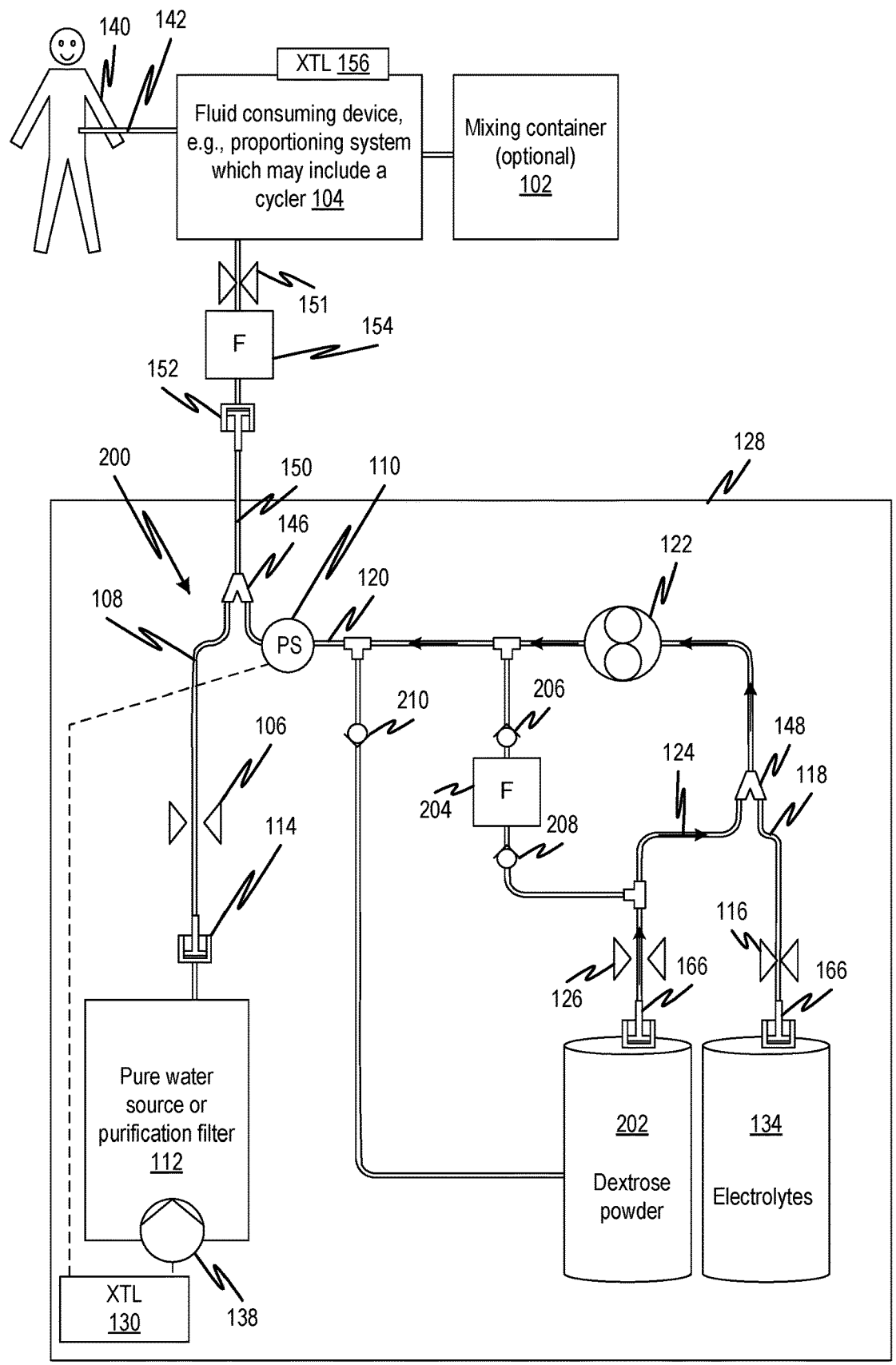
FIG. 5 shows the consumption of dextrose from the dextrose container according to embodiments of the disclosed subject matter.

Once there is liquid dextrose in the dextrose container 202, the system may function as illustrated with regard to FIG. 1 by pumping the pump 122 in the opposite direction to flow dextrose concentrate out of the dextrose container 202. As shown in FIG. 5, the liquid dextrose may be pumped from the dextrose container 202 as indicated by the arrows.

Note that relative to the system of FIG. 1, the pressure sensor 110 is relocated to indicate pressure in the lines leading to the dextrose container 202. Note that the filter 204 may be present or omitted according to various embodiments.

Figure 6:
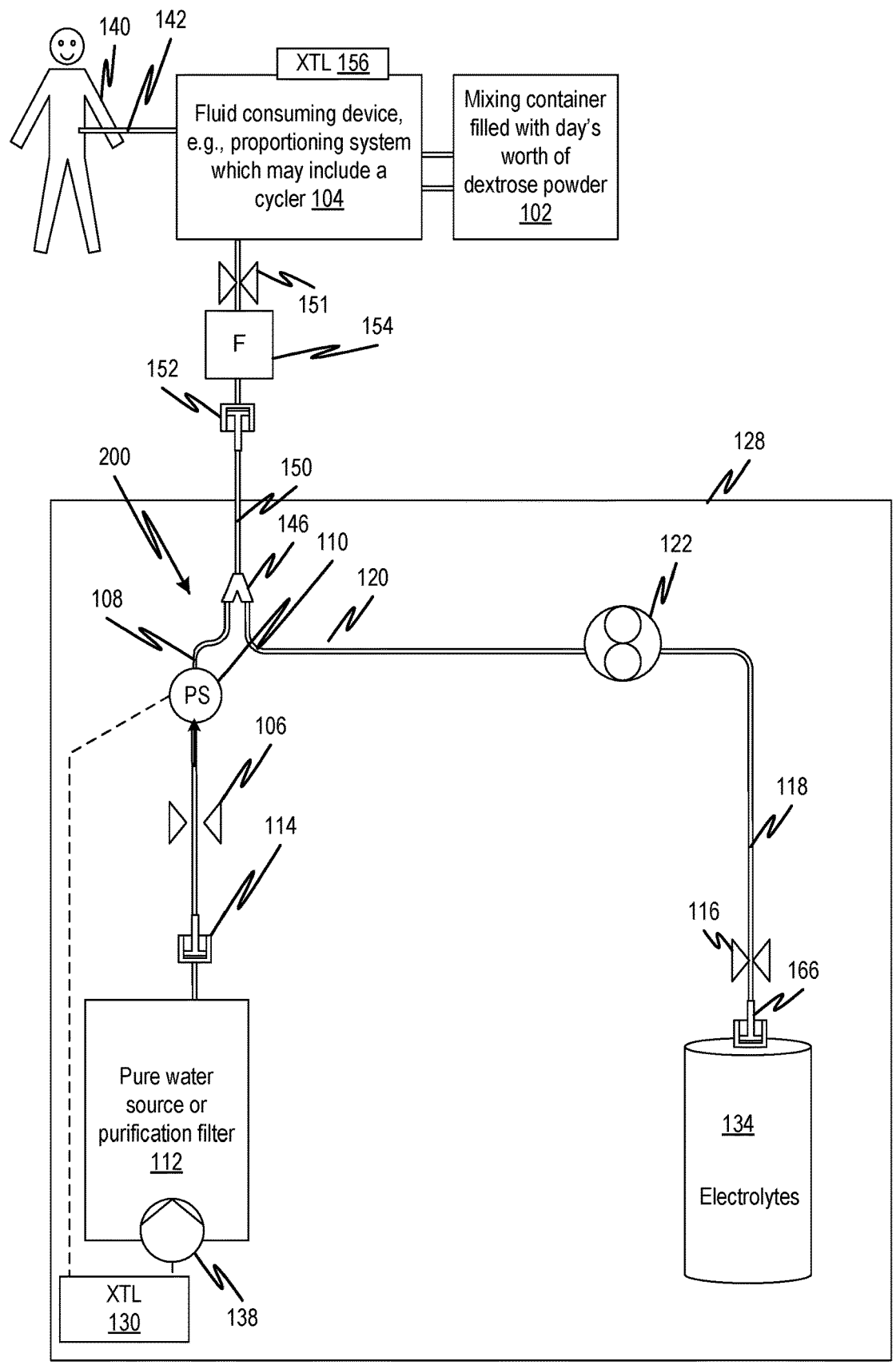
FIGS. 6 and 7 shows an alternative embodiment in which a mixing container contains enough dextrose powder for at least a single treatment according to embodiments of the disclosed subject matter.
Figure 7:
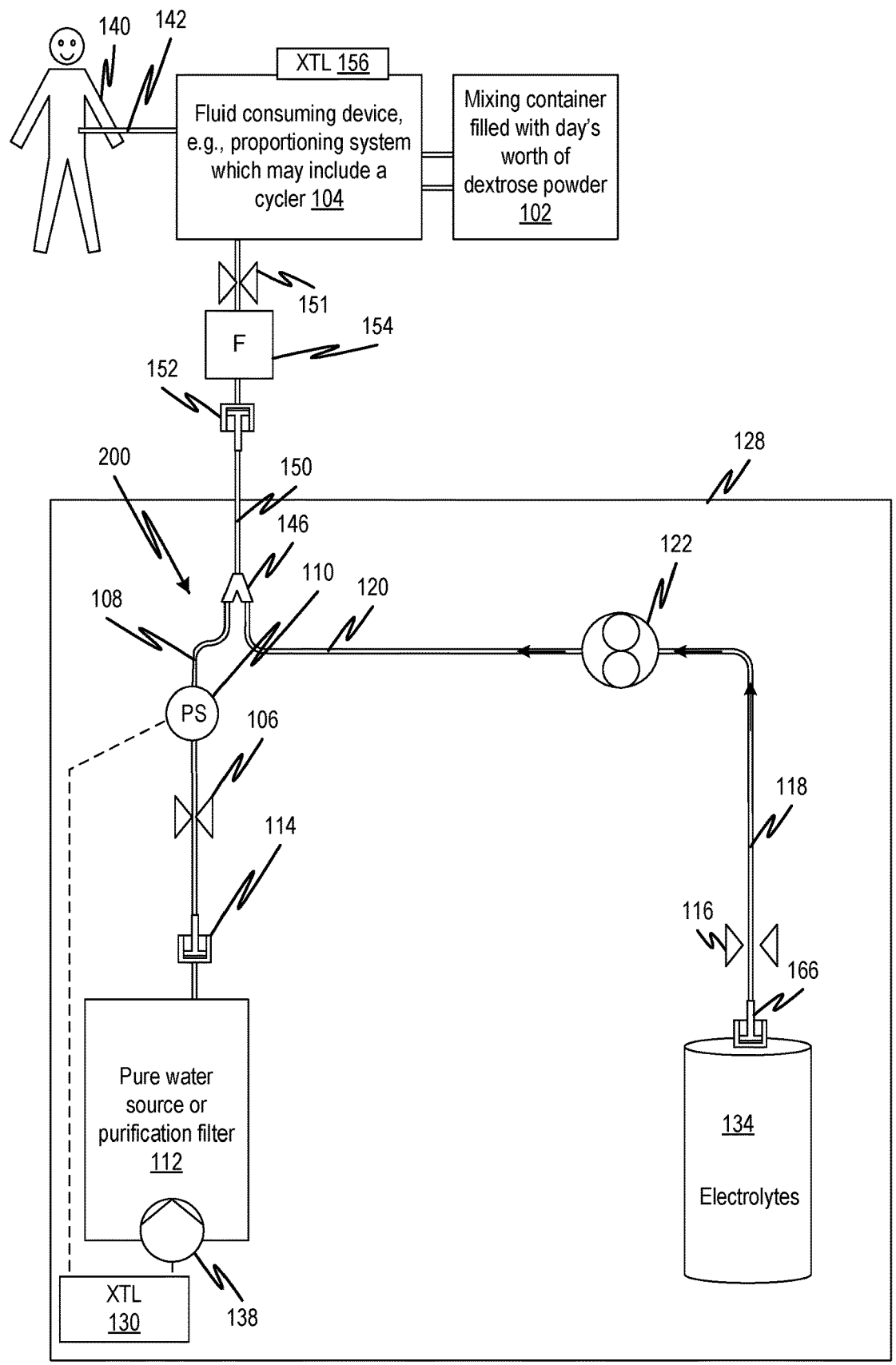

An alternative configuration is shown in FIG. 6 where dextrose powder is provided in a mixing container 102 which receives electrolyte concentrate and water to form a full treatment's worth of dialysis fluid. In the embodiment of FIG. 6 water is pumped as required to dilute the dextrose powder and form a fully diluted liquid. The pumping of water is illustrated by the arrows in FIG. 6. Then electrolyte concentrate is pumped into the mixing container 102 as shown in FIG. 7. The mixing container contents may then be further diluted as required and mixed by the fluid consuming device 104 which may include a proportioning system with a pump. Note that the controller 156 may send commands to the controller 130 for the water pumping operation. Note that in FIG. 6, the clamp 106 for water is shown in the opened position and the electrolyte concentrate line clamp 116 is shown in the closed position for the addition of water to the mixing container 102. In FIG. 7, the water line clamp 106 is closed and the electrolyte concentrate line clamp 116 is opened. It will be understood that the same clamp would be closed when electrolyte concentrate is pumped using the pump 122 along the path indicated by the arrows and the while the electrolyte concentrate line clamp 116 is opened and the water line clamp 106 is closed.

Figure 8:
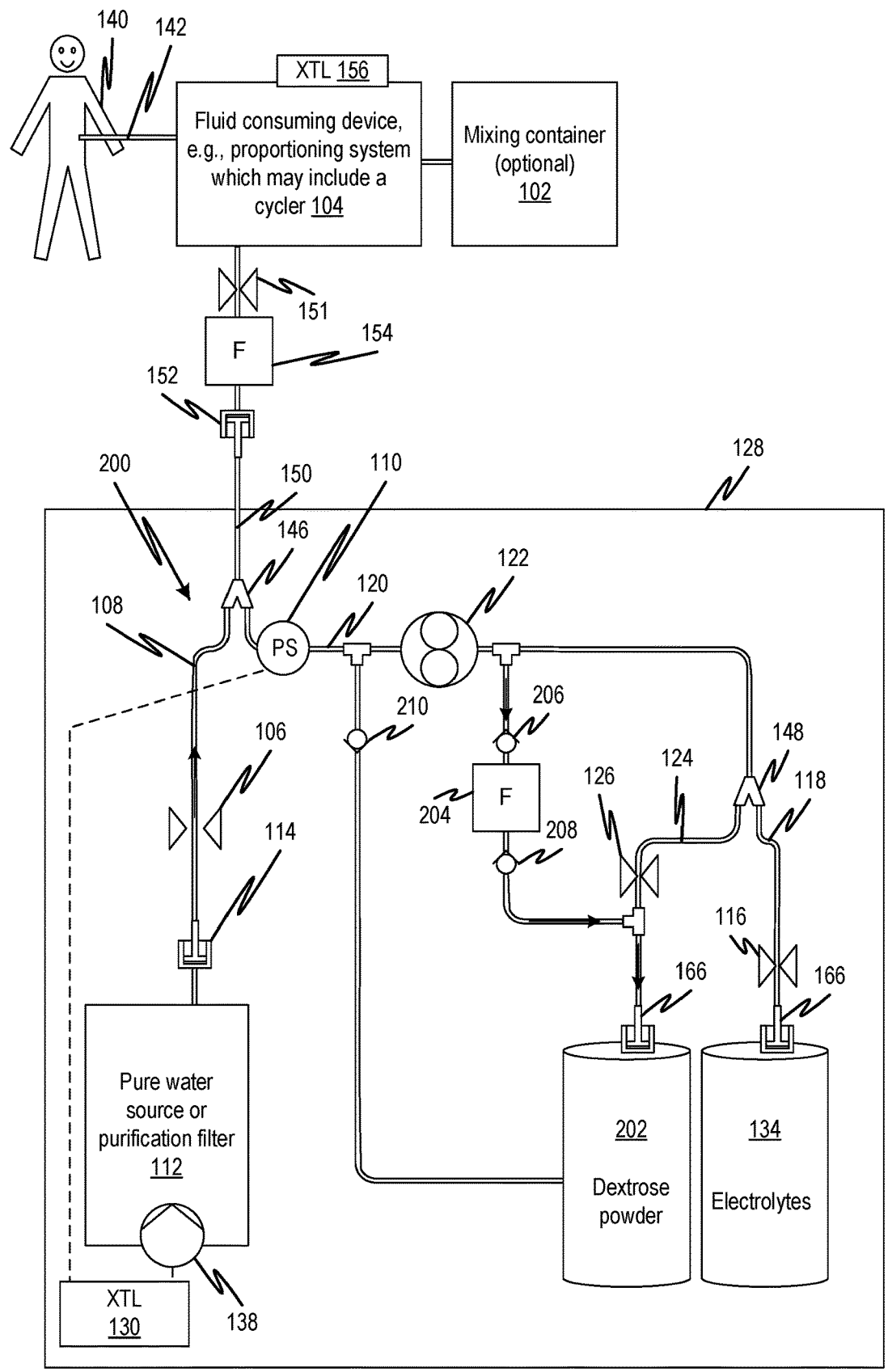
FIGS. 8, 9, and 10 show an alternative configuration for mixing powdered dextrose according to further embodiments of the disclosed subject matter.
Figure 9:
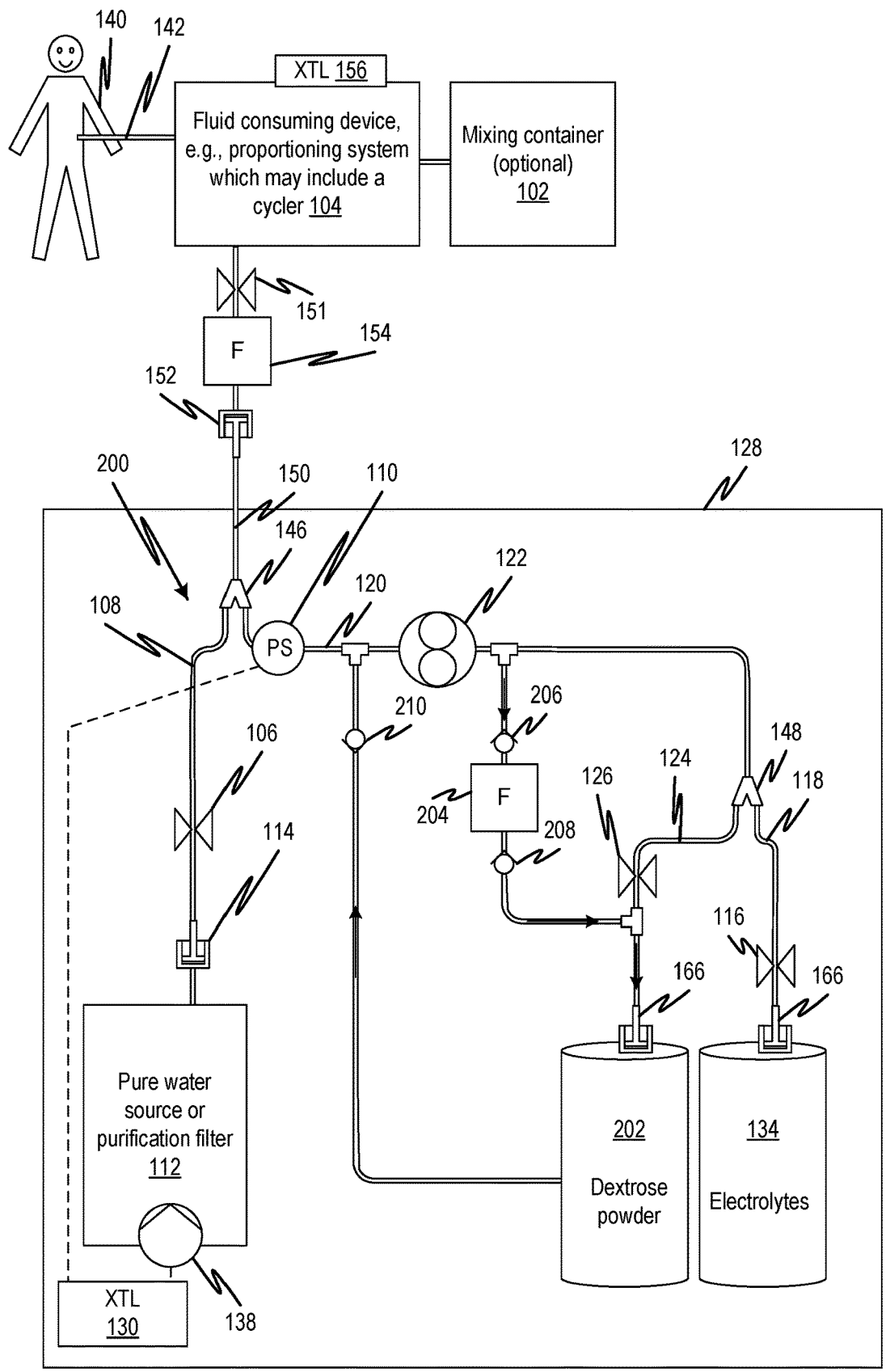
Figure 10:
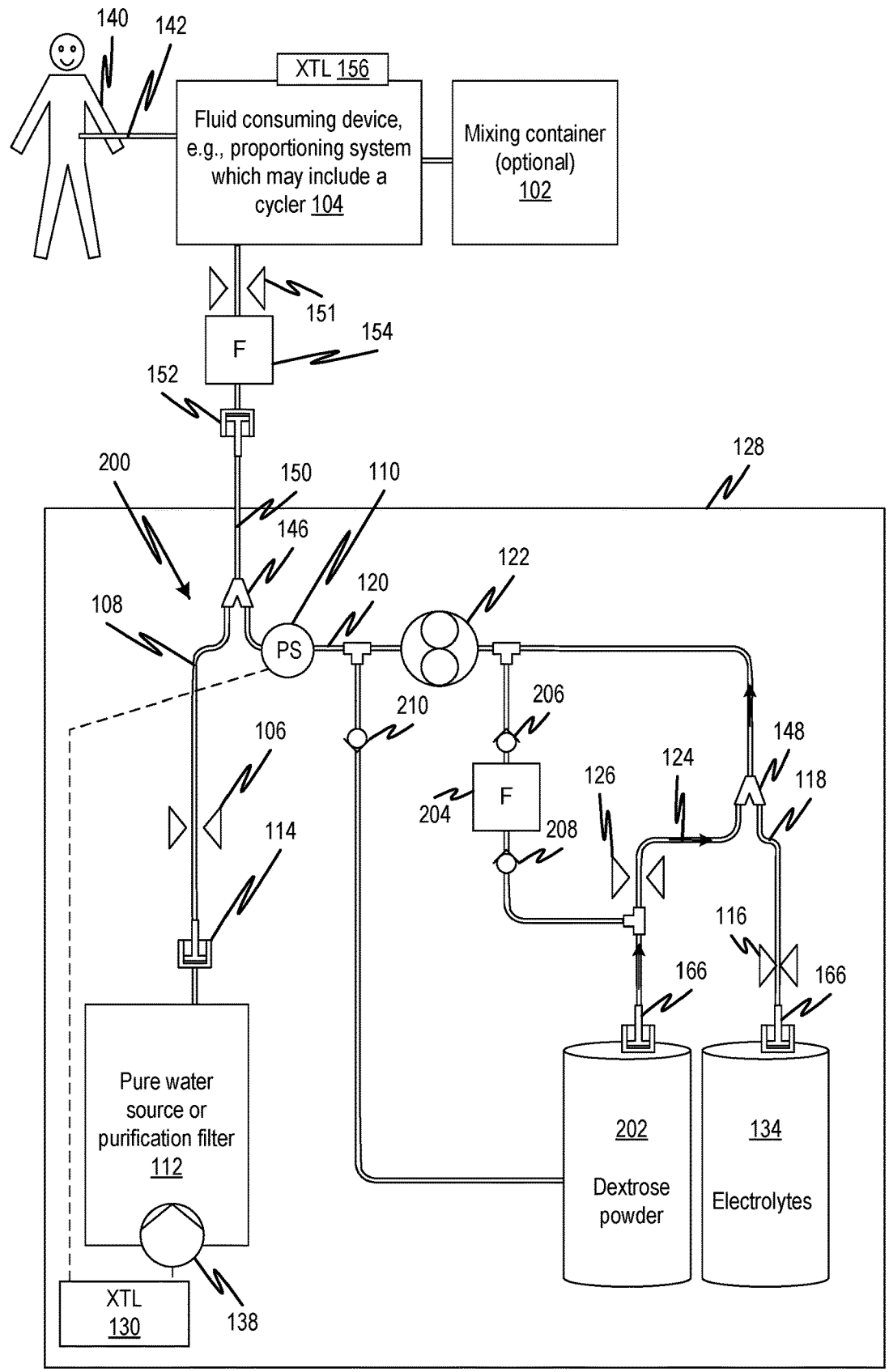

Another alternative configuration is shown in FIG. 8. Here the location of the pump 122 has been changed. During a dextrose container 202 fill operation, the osmotic agent concentrate line clamp 126 is closed and water is pumped by the precision water pump 138 in tandem with the pump 122 into the dextrose container 202 through fluid outflow check valve 206 and test check valve 208. During this operation water line clamp 106 is also opened. As shown in FIG. 9, to mix the dextrose with water, the pump 122 runs in the forward direction with the water line clamp 106 closed such that fluid circulates under control of the fluid outflow check valve 206, test check valve 208, and check valve 210. Once mixed the dextrose concentrate may be consumed as shown in FIG. 10 and described with respect to the foregoing embodiments. That is, by opening osmotic agent concentrate line clamp 126 and the pump 122 the dextrose concentrate may be removed from the dextrose container 202.

Figure 11:
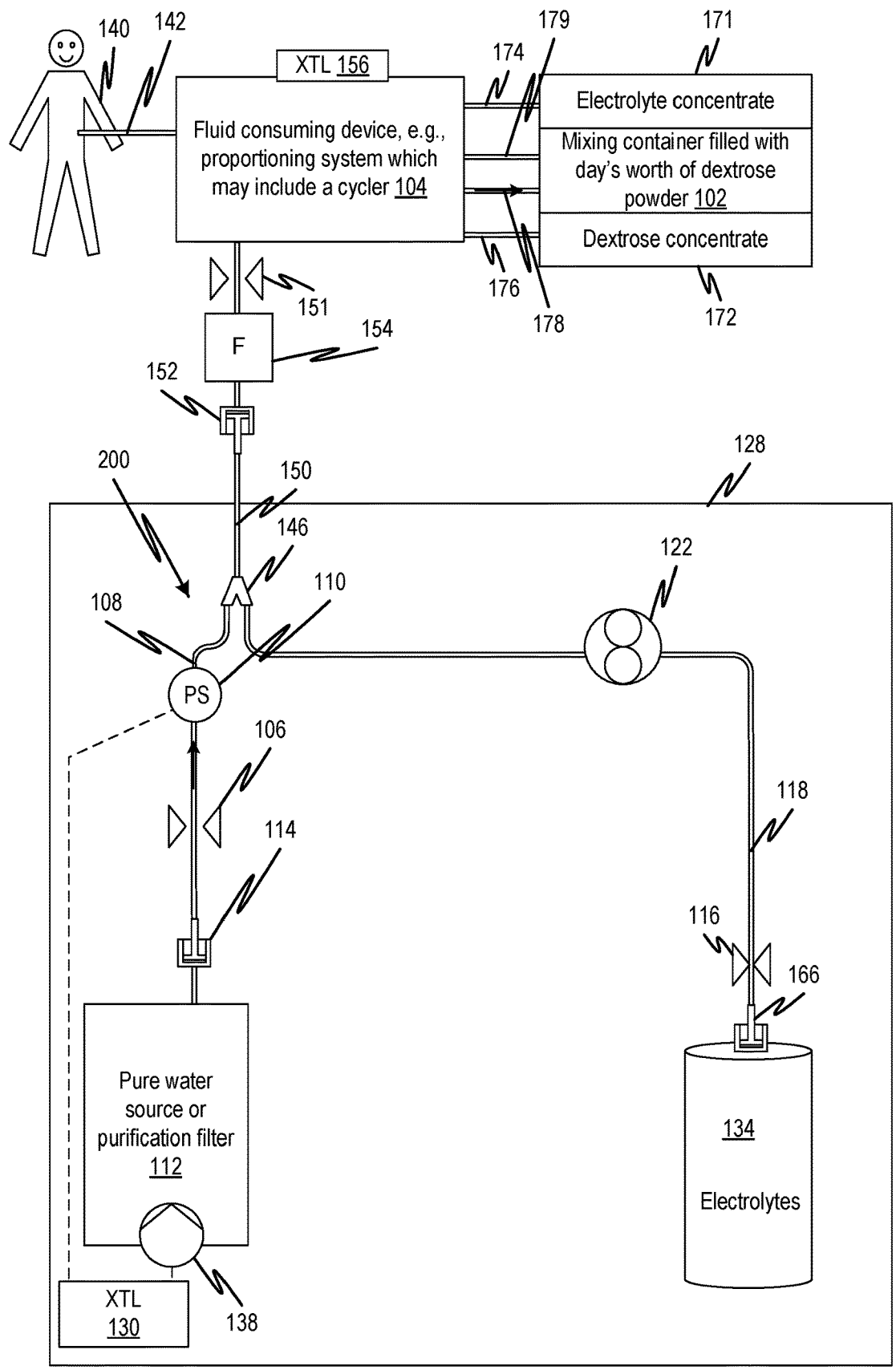
FIGS. 11 through 18 show an embodiment in which dextrose powder is mixed a mixing chamber and the resulting concentrate is stored for use in a disposable container, according to embodiments of the disclosed subject matter.
Figure 12:
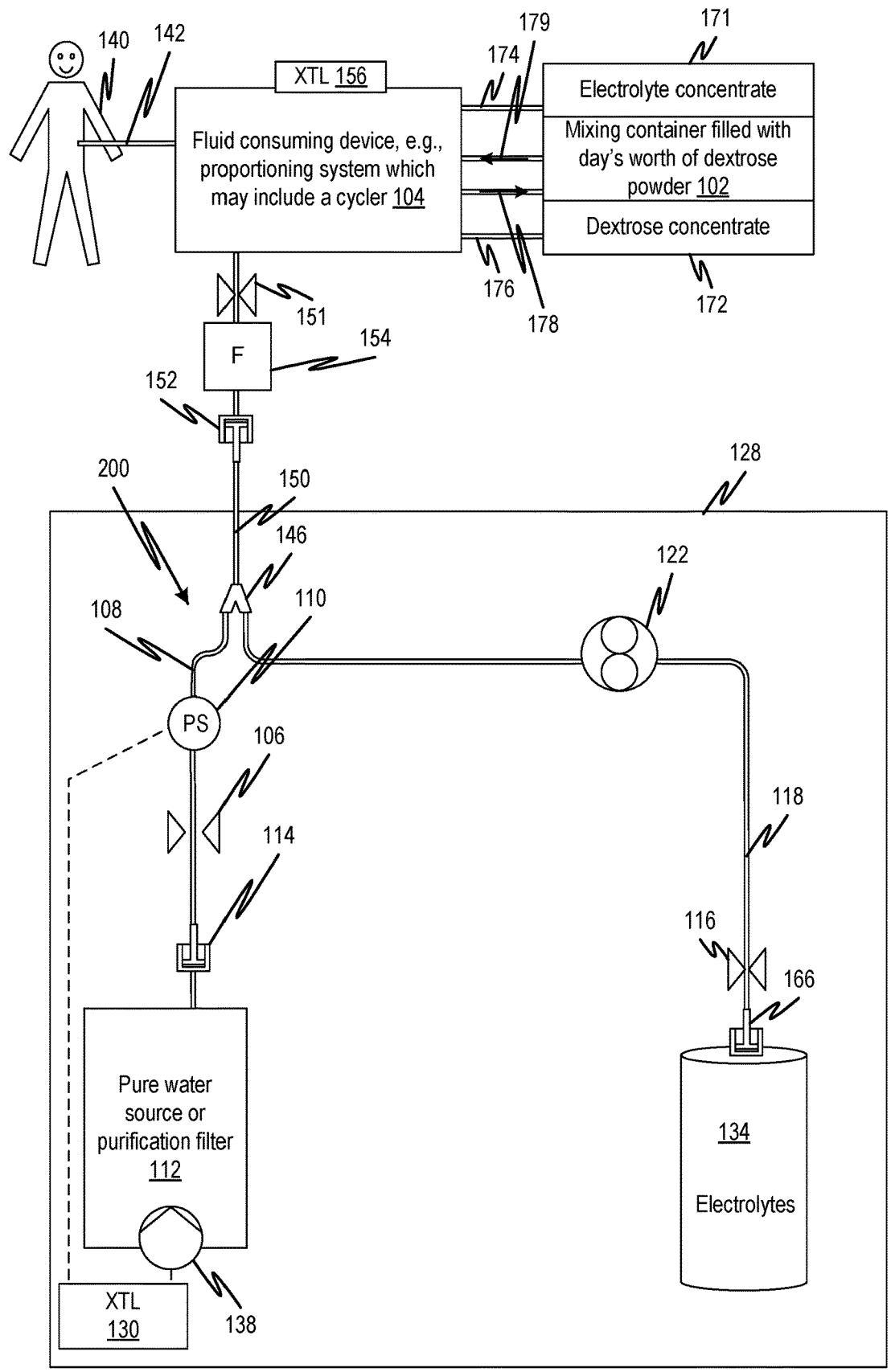
Figure 13:
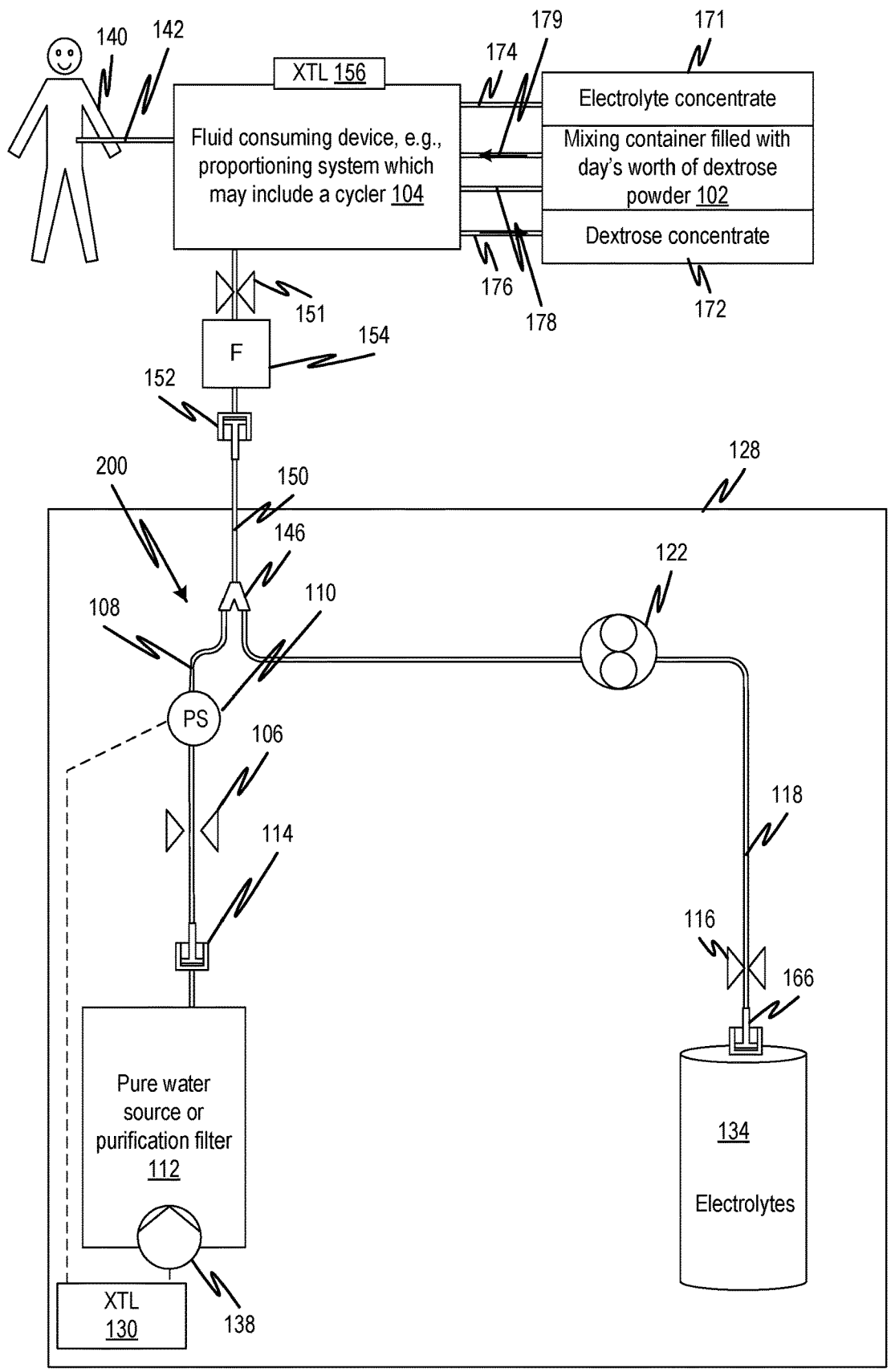
Figure 14:
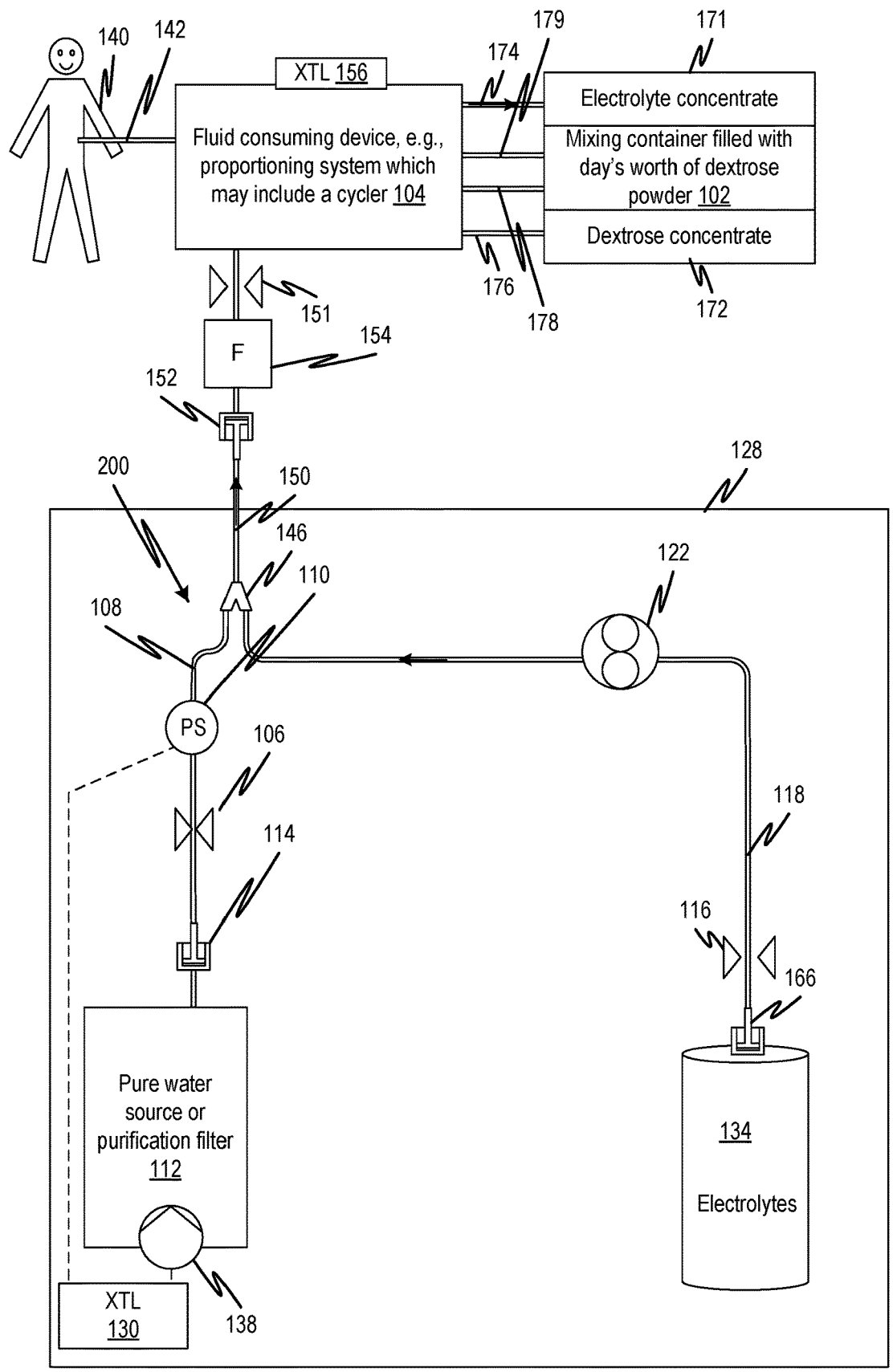
Figure 15:
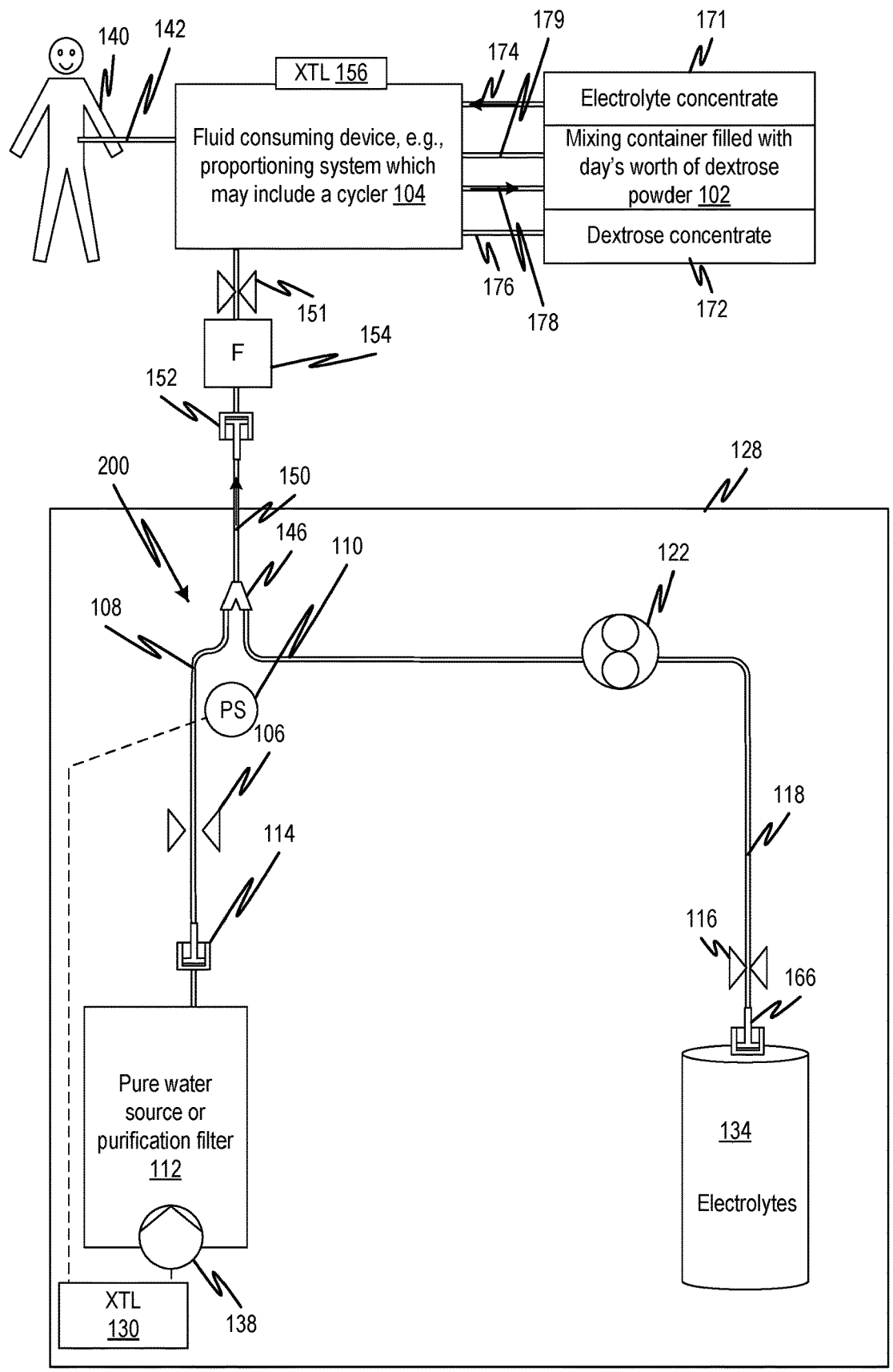
Figure 16:
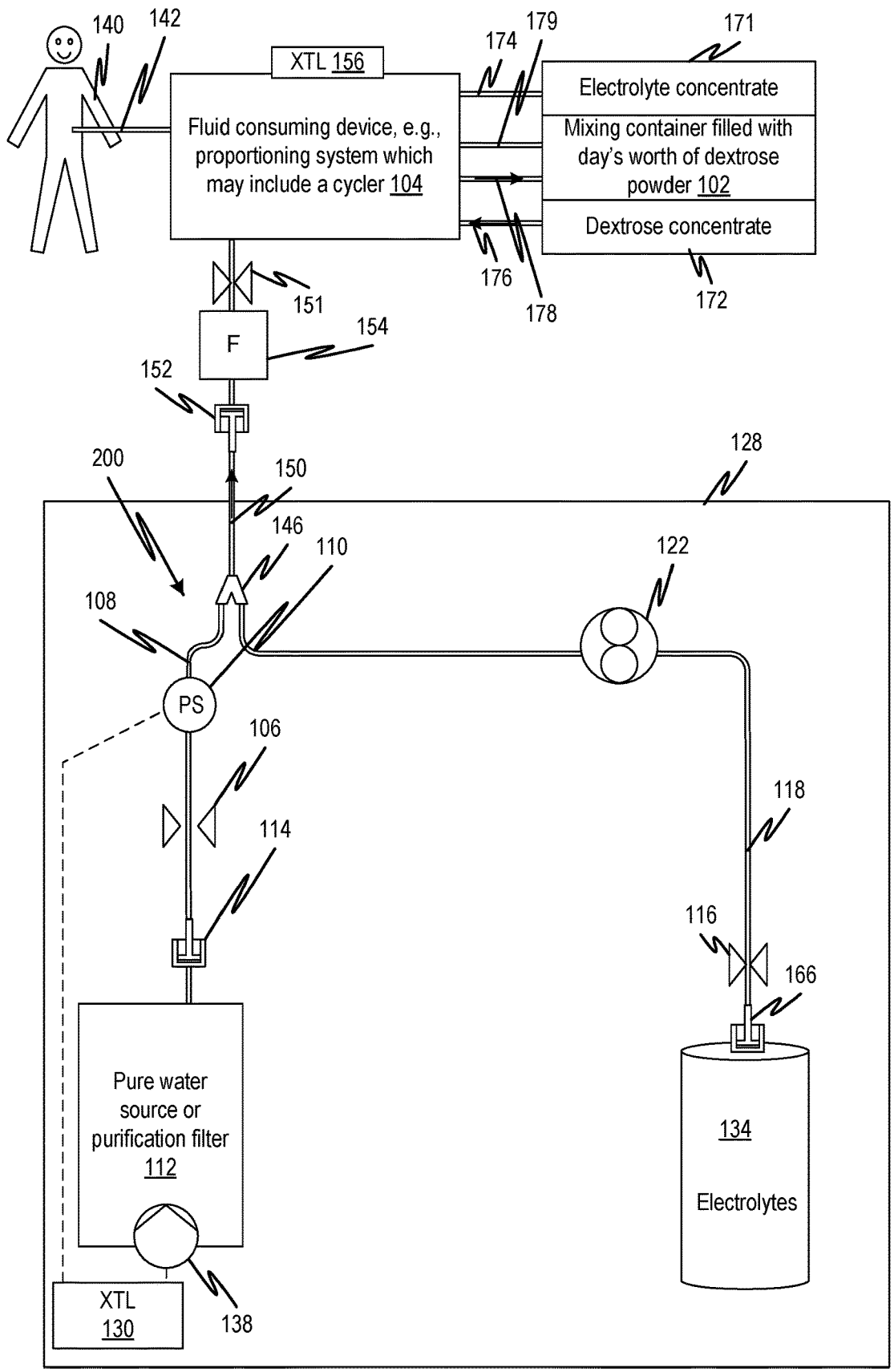
Figure 17:
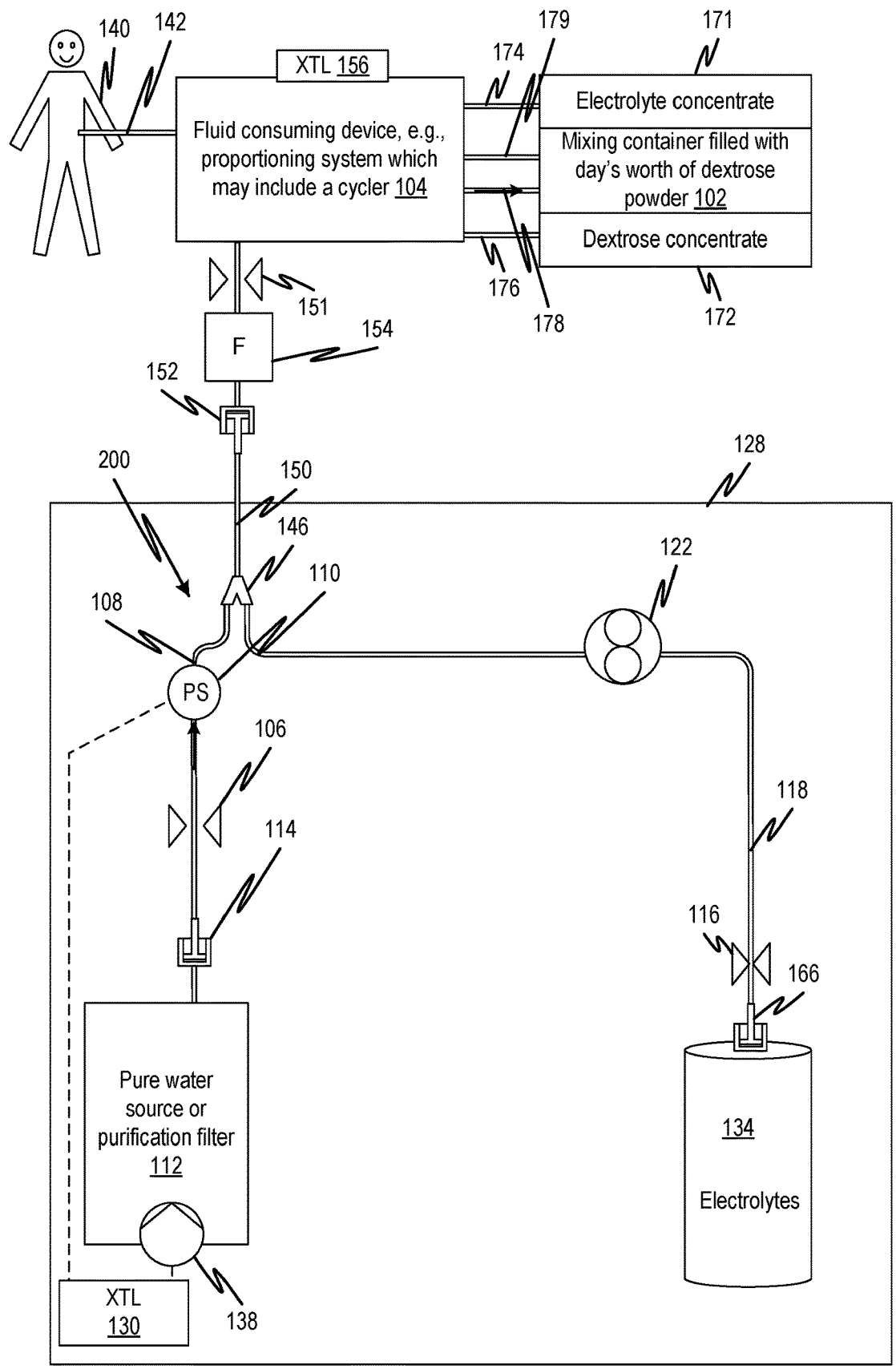
Figure 18:
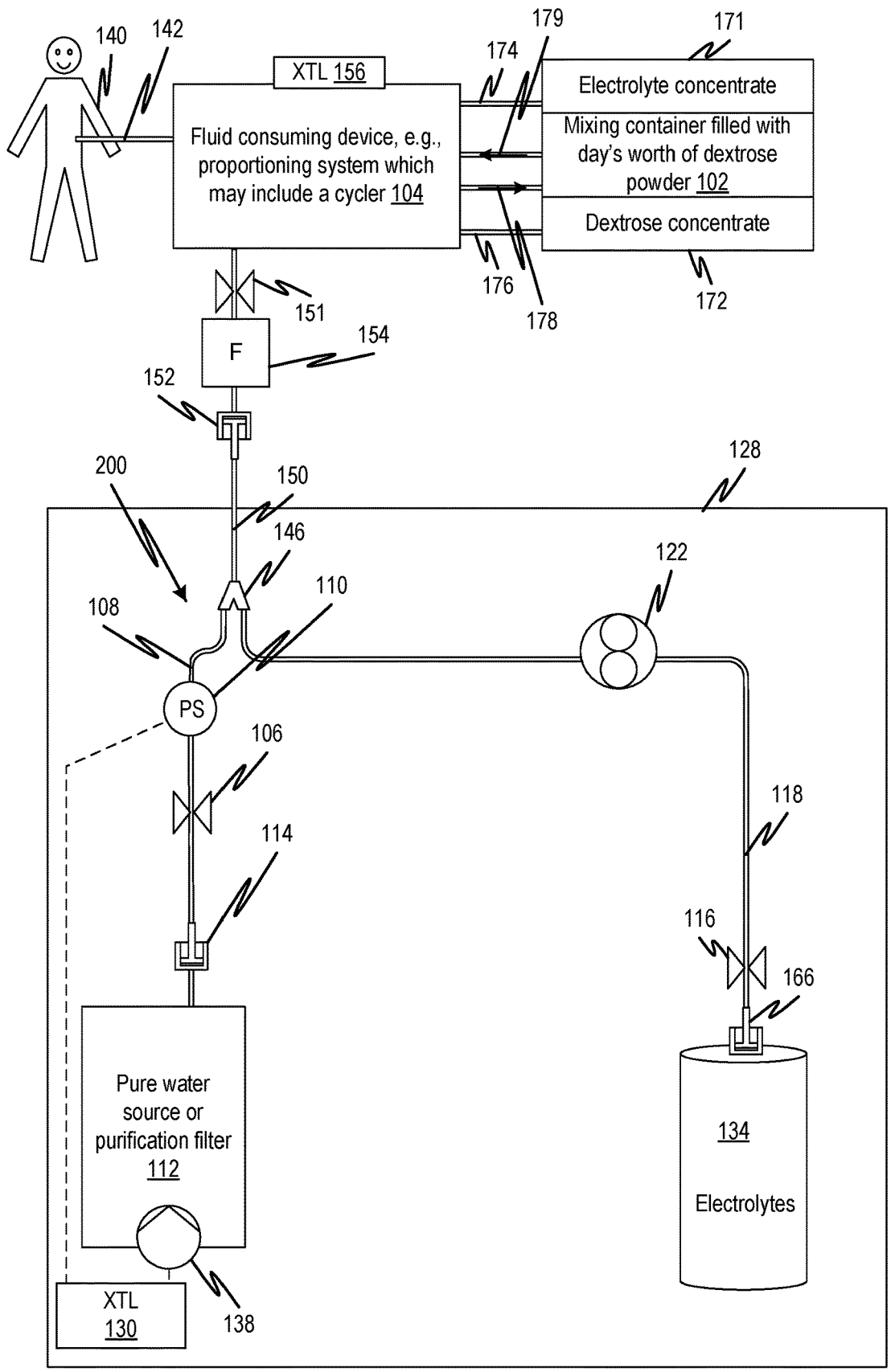

Another configuration supplies water to a mixing container 102 pre-filled with dextrose powder. The quantity of dextrose powder may be sufficient for a full day's treatment. The water used to dilute it may be sufficient to create a saturated or nearly saturated concentrate which is transferred to a dextrose concentrate container 172 through fluid line 176 that connects fluid consuming device 104 to the dextrose container 172. The containers 102, 172, and 171 may be compartments of a single bag-type container, or may be separate containers physically detached from each other. As shown in FIG. 11, electrolyte container 171 is fluidly connected to line 174. Mixing container 102 in this embodiment has two fluid lines 178 and 179 connected to it. In some examples, the each of the two fluid lines 178 and 179 may be used to flow a liquid into and out of container 102 to effect thorough mixing of the content of container 102. For example, fluid may be drawn out of container 102 through fluid line 179 and then returned into container 102 through fluid line 178, with this process being repeated for some period of time that is sufficient to ensure appropriate mixing of the content of container 102. FIG. 11 shows water being pumped into the mixing container 102 with the dextrose powder. Then FIG. 12 shows the contents of the mixing container 102 being mixed by pumping the contents of the mixing container 102 using a pump in the fluid consuming device 104. As shown in FIG. 12, the concentrated dextrose solution, after mixing, is pumped from the mixing container 102 to the dextrose concentrate container 172 and as a result the dextrose concentrate container 172 contains sufficient concentrate for a full treatment of multiple fill cycles for a full daily treatment. In a further operation, electrolyte concentrate is transferred to an empty electrolyte container 171 through line 174 as shown in FIG. 13. Next electrolyte is transferred from the electrolyte concentrate container 171 to the mixing container 102 as shown in FIG. 14. In a further operation, shown in FIG. 16, dextrose concentrate is transferred to the mixing container 102 from the dextrose concentrate container 172. The contents are then diluted with water sufficient to for a single peritoneal dialysis fill cycle as shown in FIG. 17 and finally, as shown in FIG. 18, the mixing container 102 contents are mixed to form a ready-to-use dialysis fluid in the mixing container.

Figure 19:
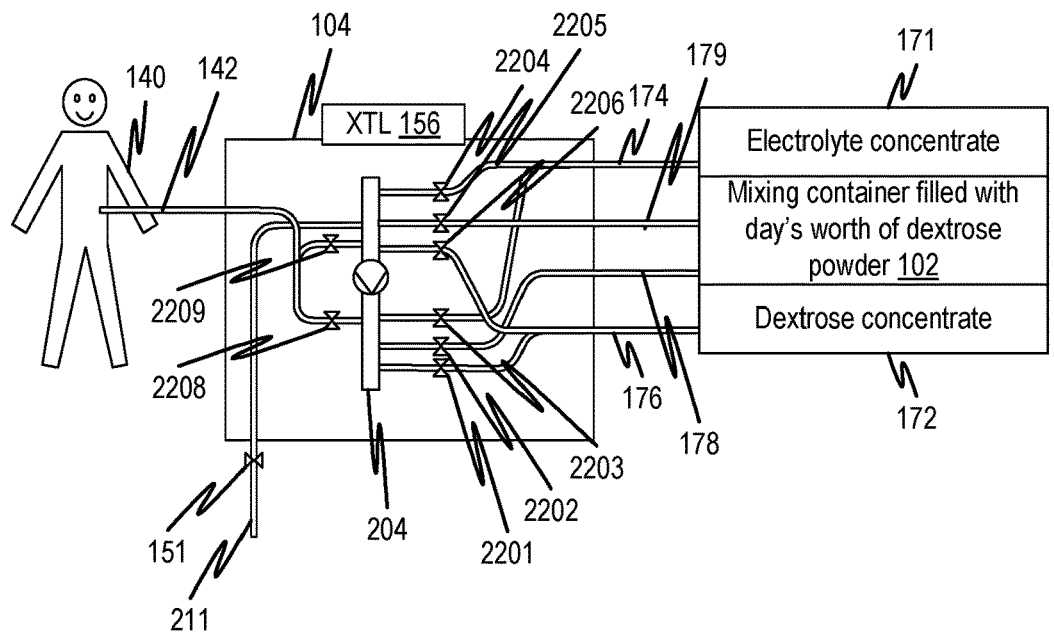
FIG. 19 shows details of an example of a fluid consuming device in the form of a proportioning system that dilutes and mixes concentrates to make a ready-to-use dialysis fluid, according to embodiments of the disclosed subject matter.

FIG. 19 shows details of an embodiment of the fluid consuming device 104. Here, pinch valves or other types of valves are illustrated as indicated as valves 2201, 2202, 2203, 2204, 2205, 2206, 2208 and 2209 with the various valves indicated by the same symbol. It will be evident by inspection that if the valves are actuated accordingly, the various flows into and out of the containers 102, 171 and 172 may be provided as illustrated in the foregoing FIGS. 11 to 18. Water line 211 conveys water into fluid consuming device 104. Table 1 indicates the valve settings for achieving the flows indicated in FIGS. 11 through 18, respectively, with O indicating the open statue and C indicating the closed state.

TABLE 1

Valve settings for respective flow configurations

| FIG. | 2201 | 2202 | 2203 | 2204 | 2205 | 2206 | 2208 | 2209 | 151 |
|---|---|---|---|---|---|---|---|---|---|
| 11 | C | O | C | C | C | C | C | C | O |
| 12 | C | O | C | C | O | C | C | C | C |
| 13 | O | C | C | C | O | C | C | C | C |
| 14 | C | C | O | C | C | C | C | C | O |
| 15 | C | O | C | O | C | C | C | C | C |
| 16 | C | O | C | C | C | O | C | C | C |
| 17 | C | O | C | C | C | C | C | C | O |
| 18 | C | O | C | C | C | O | C | C | C |

According to first embodiments, the disclosed subject matter includes a proportioning system with a solute container filled with dry solutes and a source of water. The system further includes a container of electrolyte concentrate. A fluid circuit connects the container of dry solutes to the source of water and the container of electrolyte concentrate. The fluid circuit has an empty mixing container. A controller is configured to transfer water from the source of water to the container of dry solutes through the fluid circuit and to mix them using a recirculating fluid path by opening and closing respective tubing clamps of the fluid circuit so as to prepare a solute concentrate solution in the solute container. The controller is further configured to transfer fluid from the container of electrolyte concentrate to a mixing container as well as a solute concentrate from the solute container to the mixing container and further adding water to said mixing container to form a medicament therein.

According to variations thereof, the first embodiments includes ones in which the dry solutes include sterile dextrose powder. According to variations thereof, the first embodiments includes ones in which the dry solutes includes dextrose monohydrate. According to variations thereof, the first embodiments includes ones in which the controller mixes the water and dry solutes in said solute container using a pump by flowing. According to variations thereof, the first embodiments includes ones that include a water pump configured to pump water through a water filter and then into the fluid circuit. According to variations thereof, the first embodiments includes ones that include a peristaltic pump to pump fluid through the fluid circuit. According to variations thereof, the first embodiments includes ones that include a fluid consuming device with a pump and said mixing container.

According to second embodiments, the disclosed subject matter includes a proportioning method. The method includes providing a solute container filled with dry solutes. The method includes connecting a source of water to a fluid circuit. The method includes providing a container of electrolyte concentrate connected to said fluid circuit and connecting the fluid circuit to the container of dry solutes, to the source of water, and to the container of electrolyte concentrate, the fluid circuit having an empty mixing container. The method includes using a controller transferring water from the source of water to the container of dry solutes through the fluid circuit and mixing them using a recirculating fluid path by opening and closing respective tubing clamps of the fluid circuit so as to prepare a solute concentrate solution in the solute container. The method includes using the controller transferring fluid from the container of electrolyte concentrate to a mixing container. The method includes using the controller, transferring a solute concentrate from the solute container to the mixing container. The method includes using the controller, adding water to said mixing container and mixing the contents thereof to form a medicament therein.

According to variations thereof, the second embodiments include ones in which the dry solutes include sterile dextrose powder. According to variations thereof, the second embodiments include ones in which the dry solutes includes dextrose monohydrate. According to variations thereof, the second embodiments include ones in which the controller mixes the water and dry solutes in said solute container using a pump by flowing. According to variations thereof, the second embodiments include ones in which the transferring water from the source of water to the container of dry solutes includes activating a water pump configured to pump water through a water filter and then into the fluid circuit. According to variations thereof, the first embodiments includes ones in which a peristaltic pump is used to pump fluid through the fluid circuit. According to variations thereof, the first embodiments includes ones in which the mixing container is a part of a fluid consuming device with a pump.

It will be appreciated that the modules, processes, systems, and sections described above can be implemented in hardware, hardware programmed by software, software instruction stored on a non-transitory computer readable medium or a combination of the above. For example, a method for providing peritoneal dialysis fluid can be implemented, for example, using a processor configured to execute a sequence of programmed instructions stored on a non-transitory computer readable medium. For example, the processor can include, but not be limited to, a personal computer or workstation or other such computing system that includes a processor, microprocessor, microcontroller device, or is comprised of control logic including integrated circuits such as, for example, an Application Specific Integrated Circuit (ASIC). The instructions can be compiled from source code instructions provided in accordance with a programming language such as Java, C++, C#.net or the like. The instructions can also comprise code and data objects provided in accordance with, for example, the Visual Basic™ language, LabVIEW, or another structured or object-oriented programming language. The sequence of programmed instructions and data associated therewith can be stored in a non-transitory computer-readable medium such as a computer memory or storage device which may be any suitable memory apparatus, such as, but not limited to read-only memory (ROM), programmable read-only memory (PROM), electrically erasable programmable read-only memory (EEPROM), random-access memory (RAM), flash memory, disk drive and the like.

Furthermore, the modules, processes, systems, and sections can be implemented as a single processor or as a distributed processor. Further, it should be appreciated that the steps mentioned above may be performed on a single or distributed processor (single and/or multi-core). Also, the processes, modules, and sub-modules described in the various figures of and for embodiments above may be distributed across multiple computers or systems or may be co-located in a single processor or system. Exemplary structural embodiment alternatives suitable for implementing the modules, sections, systems, means, or processes described herein are provided below.

The modules, processors or systems described above can be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and a software module or object stored on a computer-readable medium or signal, for example.

Embodiments of the method and system (or their sub-components or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a programmable logic device (PLD), programmable logic array (PLA), field-programmable gate array (FPGA), programmable array logic (PAL) device, or the like. In general, any process capable of implementing the functions or steps described herein can be used to implement embodiments of the method, system, or a computer program product (software program stored on a non-transitory computer readable medium).

Furthermore, embodiments of the disclosed method, system, and computer program product may be readily implemented, fully or partially, in software using, for example, object or object-oriented software development environments that provide portable source code that can be used on a variety of computer platforms. Alternatively, embodiments of the disclosed method, system, and computer program product can be implemented partially or fully in hardware using, for example, standard logic circuits or a very-large-scale integration (VLSI) design. Other hardware or software can be used to implement embodiments depending on the speed and/or efficiency requirements of the systems, the particular function, and/or particular software or hardware system, microprocessor, or microcomputer being utilized. Embodiments of the method, system, and computer program product can be implemented in hardware and/or software using any known or later developed systems or structures, devices and/or software by those of ordinary skill in the applicable art from the function description provided herein and with a general basic knowledge of control engineering, fluids, medical systems and/or computer programming arts.

Moreover, embodiments of the disclosed method, system, and computer program product can be implemented in software executed on a programmed general purpose computer, a special purpose computer, a microprocessor, or the like.

It is, thus, apparent that there is provided, in accordance with the present disclosure, methods, devices and systems for providing peritoneal dialysis fluid from powdered concentrate. Many alternatives, modifications, and variations are enabled by the present disclosure. Features of the disclosed embodiments can be combined, rearranged, omitted, etc., within the scope of the invention to produce additional embodiments. Furthermore, certain features may sometimes be used to advantage without a corresponding use of other features. Accordingly, Applicants intend to embrace all such alternatives, modifications, equivalents, and variations that are within the spirit and scope of the present invention.

One general aspect of the present disclosure includes a solute container filled with dry solutes. The proportioning system also includes a source of water. The system also includes a container of electrolyte concentrate. The system also includes a fluid circuit connecting the solute container to the source of water and the container of electrolyte concentrate, the fluid circuit having an empty mixing container. The system also includes a controller configured to transfer water from the source of water to the solute container through the fluid circuit so as to prepare a solute concentrate solution in the solute container. The system also includes the controller further being configured to transfer fluid from the container of electrolyte concentrate to a mixing container as well as a solute concentrate from the solute container to the mixing container and further adding water to said mixing container to form a medicament therein.

Implementations may include one or more of the following features. The system where the dry solutes include sterile dextrose powder. The dry solutes include dextrose monohydrate. The controller mixes the water and dry solutes in said solute container using a pump by flowing. The system may include a water pump configured to pump water through a water filter and then into the fluid circuit. The system may include a peristaltic pump to pump fluid through the fluid circuit. The system may include a fluid consuming device with a pump and said mixing container. Implementations of the described techniques may include hardware, a method or process, or computer software on a computer-accessible medium.

Another general aspect of the present disclosure includes a proportioning method. The proportioning method also includes providing a solute container filled with dry solutes. The method also includes connecting a source of water to a fluid circuit. The method also includes providing a container of electrolyte concentrate connected to said fluid circuit. The method also includes connecting the fluid circuit to the solute container, to the source of water, and to the container of electrolyte concentrate, the fluid circuit having an empty mixing container. The method also includes using a controller, transferring water from the source of water to the solute container through the fluid circuit so as to prepare a solute concentrate solution in the solute container. The method also includes using the controller transferring fluid from the container of electrolyte concentrate to a mixing container. The method also includes using the controller, transferring a solute concentrate from the solute container to the mixing container. The method also includes using the controller, adding water to said mixing container and mixing contents thereof to form a medicament therein. Other embodiments of this aspect include corresponding computer systems, apparatus, and computer programs recorded on one or more computer storage devices, each configured to perform the actions of the methods.

Implementations may include one or more of the following features. The proportioning method where the dry solutes include sterile dextrose powder. The dry solutes includes dextrose monohydrate. The controller mixes the water and dry solutes in said solute container using a pump by flowing. The transferring water from the source of water to the solute container activating a water pump configured to pump water through a water filter and then into the fluid circuit. A peristaltic pump is used to pump fluid through the fluid circuit. The mixing container is a part of a fluid consuming device with a pump. Implementations of the described techniques may include hardware, a method or process, or computer software on a computer-accessible medium.

Another general aspect of the present disclosure includes a proportioning system. The proportioning system also includes a large electrolyte concentrate container containing sufficient electrolyte concentrate to make enough dialysis fluid for multiple treatments each including multiple peritoneal fill cycles. The system also includes a fluid circuit with an empty small electrolyte container, an empty osmotic agent container, and a mixing container containing dry osmotic agent powder. The system also includes a controller, pumping and valve actuators, the controller being connected to control the pumping and valve actuators. The system also includes a water source. The system also includes the controller being configured to actuate the pumping and valve actuators to transfer water from the water source through the fluid circuit into the mixing container to form a concentrated solution of osmotic agent in the mixing container. The system also includes the controller being configured to actuate the pumping and valve actuators to transfer the concentrate solution of osmotic agent from the mixing container to the osmotic agent container. The system also includes the controller being configured to actuate the pumping and valve actuators to mix the electrolyte and osmotic agent concentrates with water in the mixing container to form a ready-to-use dialysate fluid. Other embodiments of this aspect include corresponding computer systems, apparatus, and computer programs recorded on one or more computer storage devices, each configured to perform the actions of the methods.

Implementations may include one or more of the following features. The system where the controller is configured to actuate the pumping and valve actuators to transfer electrolyte from the large electrolyte concentrate container to the empty small electrolyte concentrate container. The controller is configured to actuate the pumping and valve actuators to transfer electrolyte from the small electrolyte concentrate container to the mixing container. The dry solutes include sterile dextrose powder. The dry solutes includes dextrose monohydrate. The controller mixes the water and dry solutes in said solute container using a pump by flowing. The transferring water from the source of water to the solute container activating a water pump configured to pump water through a water filter and then into the fluid circuit. A peristaltic pump is used to pump fluid through the fluid circuit. The mixing container is a part of a fluid consuming device with a pump. The dry solutes include sterile dextrose powder. The dry solutes include dextrose monohydrate. The controller mixes the water and dry solutes in said solute container using a pump by flowing. The system may include a water pump configured to pump water through a water filter and then into the fluid circuit. The system may include a peristaltic pump to pump fluid through the fluid circuit. The system may include a fluid consuming device with a pump and said mixing container. Implementations of the described techniques may include hardware, a method or process, or computer software on a computer-accessible medium.

Figure 20:
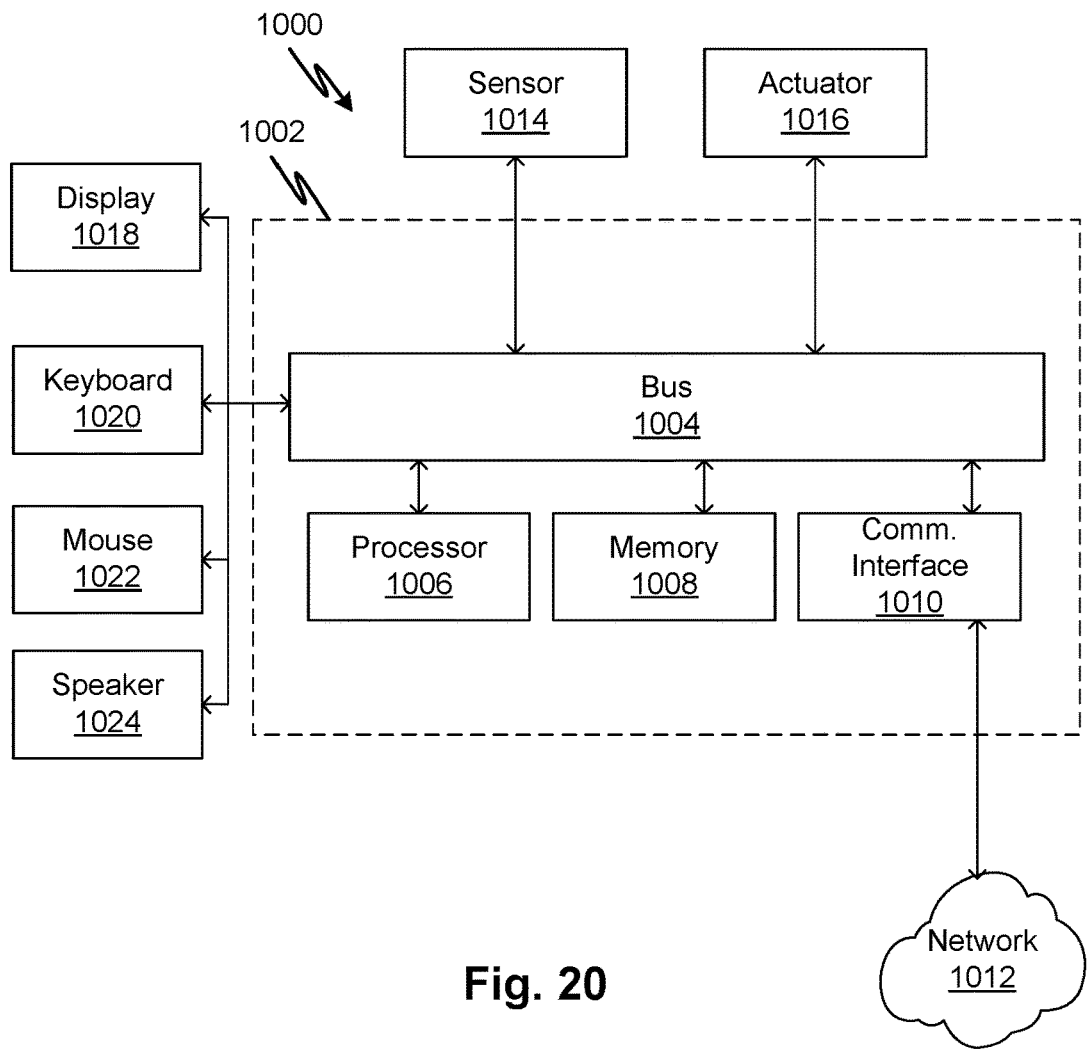
FIG. 20 shows a computer system that describes details that may be incorporated in any recited controller according to the embodiments of the disclosed subject matter.

FIG. 20 shows a block diagram of an example computer system according to embodiments of the disclosed subject matter. In various embodiments, all or parts of system 1000 may be included in a medical treatment device/system such as a renal replacement therapy system. In these embodiments, all or parts of system 1000 may provide the functionality of a controller of the medical treatment device/systems. In some embodiments, all or parts of system 1000 may be implemented as a distributed system, for example, as a cloud-based system.

System 1000 includes a computer 1002 such as a personal computer or workstation or other such computing system that includes a processor 1006. However, alternative embodiments may implement more than one processor and/or one or more microprocessors, microcontroller devices, or control logic including integrated circuits such as ASIC.

Computer 1002 further includes a bus 1004 that provides communication functionality among various modules of computer 1002. For example, bus 1004 may allow for communicating information/data between processor 1006 and a memory 1008 of computer 1002 so that processor 1006 may retrieve stored data from memory 1008 and/or execute instructions stored on memory 1008. In one embodiment, such instructions may be compiled from source code/objects provided in accordance with a programming language such as Java, C++, C#, .net, Visual Basic™ language, LabVIEW, or another structured or object-oriented programming language. In one embodiment, the instructions include software modules that, when executed by processor 1006, provide renal replacement therapy functionality according to any of the embodiments disclosed herein.

Memory 1008 may include any volatile or non-volatile computer-readable memory that can be read by computer 1002. For example, memory 1008 may include a non-transitory computer-readable medium such as ROM, PROM, EEPROM, RAM, flash memory, disk drive, etc. Memory 1008 may be a removable or non-removable medium.

Bus 1004 may further allow for communication between computer 1002 and a display 1018, a keyboard 1020, a mouse 1022, and a speaker 1024, each providing respective functionality in accordance with various embodiments disclosed herein, for example, for configuring a treatment for a patient and monitoring a patient during a treatment.

Computer 1002 may also implement a communication interface 1010 to communicate with a network 1012 to provide any functionality disclosed herein, for example, for alerting a healthcare professional and/or receiving instructions from a healthcare professional, reporting patient/device conditions in a distributed system for training a machine learning algorithm, logging data to a remote repository, etc. Communication interface 1010 may be any such interface known in the art to provide wireless and/or wired communication, such as a network card or a modem.

Bus 1004 may further allow for communication with a sensor 1014 and/or an actuator 1016, each providing respective functionality in accordance with various embodiments disclosed herein, for example, for measuring signals indicative of a patient/device condition and for controlling the operation of the device accordingly. For example, sensor 1014 may provide a signal indicative of a viscosity of a fluid in a fluid circuit in a renal replacement therapy device, and actuator 1016 may operate a pump that controls the flow of the fluid responsively to the signals of sensor 1014.

What is claimed is:

1. A proportioning system, comprising:
    a solute container filled with dry solutes and having at least an inlet port and an outlet port;
    a source of purified water;
    a container of electrolyte concentrate;
    a fluid circuit connecting the inlet port of the solute container and the outlet port of the solute container to the source of water and to the container of electrolyte concentrate, the fluid circuit being fluidly connected to an empty mixing container;
    a plurality of controllable clamps that open and close flow in portions of the fluid circuit;
    a peristaltic pump configured to pump fluid through the fluid circuit; and
    a controller configured to open and close the controllable clamps and to control the peristaltic pump, wherein
    the controller is further configured to open a first controllable clamp and a second controllable clamp to thereby transfer purified water from the source of purified water to the inlet port of the solute container through the fluid circuit while accounting for residual water in tube lengths that form a circulating path between the inlet port of the solute container and the outlet port of the solute container,
    the controller is further configured to, after the transferring, open the second controllable clamp, close all other controllable clamps, and control the peristaltic pump to rotate in a first direction to thereby circulate a mixture of the purified water and the dry solutes out of the outlet port of the solute container and into the inlet port of the solute container so as to prepare a solute concentrate solution in the solute container,
    the controller is further configured to, after the circulating the mixture of the purified water and the dry solutes, control the peristaltic pump to rotate in a second direction, opposite to the first direction, to thereby transfer a fluid from the container of electrolyte concentrate to the mixing container and as well as a liquid solute concentrate from the solute container to the mixing container, and
    the controller is further configured to add purified water to the mixing container to form a medicament in the mixing container.

2. The system of claim 1, wherein the dry solutes include at least one of dextrose monohydrate and sterile dextrose powder.

3. The system of claim 1, wherein the controller is configured to control the proportioning system to mix the water and dry solutes in said solute container using a pump to flow the water through at least a portion of the fluid circuit.

4. The system of claim 1, further comprising a water pump configured to pump water through a water filter and then into the fluid circuit.

5. The system of claim 1, further comprising a fluid consuming device with a pump and said mixing container.

6. A proportioning method, comprising:
    providing a solute container that has an inlet port and an outlet port and filled with dry solutes;
    providing a fluid circuit;
    connecting a source of purified water to the fluid circuit;

providing a container of electrolyte concentrate;

connecting the fluid circuit to the inlet port of the solute container, to the outlet port of the solute container, to the source of purified water, and to the container of electrolyte concentrate, the fluid circuit being fluidly connected to an empty mixing container;

using a controller to open a first controllable clamp and a second controllable clamp to thereby transfer purified water from the source of purified water to the inlet port of the solute container through the fluid circuit while accounting for residual water in tube lengths that form a circulating path between the inlet port of the solute container and the outlet port of the solute container;

after the transferring, opening the second controllable clamp, closing all other controllable clamps, and controlling a peristaltic pump to rotate in a first direction to thereby circulate a mixture of the purified water and the dry solutes out of the outlet port of the solute container and into the inlet port of the solute container so as to prepare a solute concentrate solution in the solute container;

after preparing the solute concentrate solution, controlling the peristaltic pump to rotate in a second direction, opposite to the first direction, to thereby transfer a fluid from the container of electrolyte concentrate to the mixing container and to transfer the solute concentrate solution from the solute container to the mixing container; and using the controller, adding purified water to the mixing container and mixing contents of the mixing container to form a medicament in the mixing container.

7. The proportioning method of claim 6, wherein the dry solutes include at least one of dextrose monohydrate and sterile dextrose powder.

8. The proportioning method of claim 6, wherein the transferring of purified water from the source of purified water to the solute container includes activating a water pump configured to pump the purified water through a water filter and then into the fluid circuit.

9. The proportioning method of claim 6, wherein the mixing container is a part of a fluid consuming device with a pump.

* * * * *